US011932745B2

(12) United States Patent
Begag et al.

(10) Patent No.: US 11,932,745 B2
(45) Date of Patent: Mar. 19, 2024

(54) WATER CO-CATALYST FOR POLYIMIDE PROCESSES

(71) Applicant: Aspen Aerogels, Inc., Northborough, MA (US)

(72) Inventors: Redouane Begag, Hudson, MA (US); Roxana Trifu, Worcester, MA (US); Nicholas A. Zafiropoulos, Wayland, MA (US); Harris R. Miller, Sharon, MA (US); George L. Gould, Mendon, MA (US); Nicholas Leventis, Worcester, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 153 days.

(21) Appl. No.: 17/546,529

(22) Filed: Dec. 9, 2021

(65) Prior Publication Data

US 2022/0185985 A1    Jun. 16, 2022

Related U.S. Application Data

(60) Provisional application No. 63/124,454, filed on Dec. 11, 2020.

(51) Int. Cl.
| | |
|---|---|
| *C01B 32/00* | (2017.01) |
| *C04B 35/524* | (2006.01) |
| *C04B 35/634* | (2006.01) |
| *C04B 38/00* | (2006.01) |
| *C08G 73/00* | (2006.01) |
| *C08G 73/10* | (2006.01) |
| *C08J 9/28* | (2006.01) |
| *C08J 9/36* | (2006.01) |
| *C08K 5/09* | (2006.01) |
| *C08K 5/3432* | (2006.01) |

(52) U.S. Cl.
CPC .......... *C08J 9/286* (2013.01); *C08G 73/1007* (2013.01); *C08G 73/1067* (2013.01); *C08G 73/1085* (2013.01); *C08J 9/36* (2013.01); *C08K 5/09* (2013.01); *C08K 5/3432* (2013.01); *C08J 2201/0422* (2013.01); *C08J 2201/0482* (2013.01); *C08J 2205/026* (2013.01); *C08J 2205/042* (2013.01); *C08J 2205/044* (2013.01); *C08J 2379/08* (2013.01)

(58) Field of Classification Search
None
See application file for complete search history.

(56) References Cited

U.S. PATENT DOCUMENTS

| | | |
|---|---|---|
| 4,480,088 A | 10/1984 | Pike |
| 4,618,063 A | 10/1986 | Mendenhall |
| 5,275,796 A | 1/1994 | Tillotson et al. |
| 5,395,805 A | 3/1995 | Droege et al. |
| 5,420,168 A | 5/1995 | Mayer et al. |
| 5,565,142 A | 10/1996 | Deshpande et al. |
| 5,962,539 A | 10/1999 | Perrut et al. |
| 6,315,971 B1 | 11/2001 | Wallace et al. |
| 6,333,391 B1 | 12/2001 | Laycock et al. |
| 6,670,402 B1 | 12/2003 | Lee et al. |
| 7,071,287 B2 | 7/2006 | Rhine et al. |
| 7,074,880 B2 | 7/2006 | Rhine et al. |
| 2004/0132845 A1 | 7/2004 | Rhine et al. |
| 2014/0255642 A1* | 9/2014 | White .................... C08G 73/10 428/317.9 |
| 2017/0121483 A1* | 5/2017 | Poe ......................... C08J 9/286 |
| 2020/0269207 A1 | 8/2020 | Zafiropoulos et al. |

FOREIGN PATENT DOCUMENTS

| | | |
|---|---|---|
| CN | 110437492 A | 11/2019 |
| CN | 110591142 A | 12/2019 |
| CN | 110606979 A | 12/2019 |
| CN | 111253614 A | 6/2020 |
| JP | 2006265371 A * | 10/2006 |
| WO | 2016127084 A1 | 8/2016 |

OTHER PUBLICATIONS

Machine trans of JP-2006265371-A obtained from the European Patent Office website in Jul. 2023 (Year: 2023).*
International Search Report and Written Opinion issued in International Patent Application No. PCT/US2021/062710 dated Apr. 7, 2022.
Chiefari et al., "Water as Solvent in Polyimide Synthesis II: Processable Aromatic Polyimides", High Performance Polymers, vol. 18, 2006, pp. 31-44.
Chiefari et al., "Water as Solvent in Polyimide Synthesis: Thermoset and Thermoplastic Examples", High Performance Polymers, vol. 15, No. 3, 2003, pp. 269-279.
Davies, J. T., "A quantitative kinetic theory of emulsion type, I. Physical chemistry of the emulsifying agent (1957)", Gas/Liquid and Liquid/Liquid Interface, Proceedings of the 2nd International Congress of Surface Activity, 1957 pp. 426-438.

(Continued)

*Primary Examiner* — Melissa A Rioja
(74) *Attorney, Agent, or Firm* — WOMBLE BOND DICKINSON; Deborah M. Vernon; Scott R. Breining

(57) ABSTRACT

The present disclosure is directed to methods of forming polyimide gels. The methods generally include forming a polyamic acid and dehydrating the polyamic acid with a dehydrating agent in the presence of water. The resulting polyimide gels may be converted to polyimide or carbon xerogels or aerogels. The methods are advantageous in providing rapid or even instantaneous gelation, which may be particularly useful in formation of beads comprising the polyimide gels. Polyimide or carbon gel materials prepared according to the disclosed method are suitable for use in environments containing electrochemical reactions, for example as an electrode material within a lithium-ion battery.

34 Claims, 18 Drawing Sheets

(56) References Cited

OTHER PUBLICATIONS

Dimov, D. et al., Microwave assisted processes for producing thin layer materials in the field of nanotechnology, Journal of Optoelectronics and Advanced Materials, Feb. 2007, 494-497, vol. 9, No. 2.

Griffin, W. C., "Calculation of HLB values of Nonionic Surfactants", Journal of the Society of Cosmetic Chemists, vol. 5, No. 4, 1954, pp. 249-256.

Griffin, W. C., "Classification of Surface-Active Agents by "HLB"", Journal of the Society of Cosmetic Chemists, vol. 1, No. 5, 1949, pp. 311-326.

Kim et al., "Rheological analysis of the gelation behavior of tetraethylorthosilane/ vinyltriethoxysilane hybrid solutions", Korean Journal of Chemical Engineering. vol. 19, 2002, pp. 190-196.

Kistler, S. S., "Coherent Expanded-Aerogels", Journal of Physical Chemistry, vol. 36, No. 1, 1932, pp. 52-64.

Muthukumar, M., "Screening effect on viscoelasticity near the gel point", Macromolecules, vol. 22, No. 12, 1989, pp. 4656-4658.

Tong et al., "Synthesis of aromatic polyimides in DMAc containing large amount of water and the properties thereof", Polymer Bulletin, vol. 42, 1999, pp. 47-53.

Winter et al., "Can the gel point of a cross-linking polymer be detected by the G'-G" crossover?", Polymer Engineering and Science, vol. 27, 1987, pp. 1698-1702.

Wu et al., "A green and scalable method for producing high-performance polyimide aerogels using low-boiling-point solvents and sublimation drying", Polymer Journal, vol. 48, 2016, pp. 169-175.

Xu et al., "High strength and high breaking load of single electrospun polyimide microfiber from water soluble precursor", Materials Letters, vol. 201, 2017, pp. 82-84.

Yang et al., "A Water-Soluble Polyimide Precursor: Synthesis and Characterization of Poly(amic acid) Salt", Macromolecular Research, vol. 12, No. 3, 2004, pp. 263-268.

Zhou, L. et al., Preparation of polyimide films via microwaves-sisted thermal imidization, RSC Adv., 2019, 7314-7320, vol. 9.

* cited by examiner

FIG. 4

| Py/PMDA = 0.25 | Water/PMDA molar ratio | | | | | |
|---|---|---|---|---|---|---|
| PI | 10 | 15 | 20 | 25 | 30 | 35 |
| Density PI aerogel, g/cc | 0.085 | 0.116 | 0.116 | 0.121 | 0.121 | 0.111 |
| BET surface area, m²/g | 486.2 | 592.6 | 505.9 | 509.6 | 501.8 | 491.3 |
| Micropore area, m²/g | 118.5 | 147.0 | 127.7 | 123.4 | 133.5 | 118.5 |
| Pore volume, cm³/g | 1.15 | 1.52 | 1.08 | 1.39 | 1.17 | 1.15 |
| Skeletal density, g/cc | 1.617 | 1.656 | 1.671 | 1.544 | 1.566 | 1.609 |
| linear Shrinkage (%) | 20.3 | 25.4 | 25.8 | 27.4 | 28.4 | 26.8 |
| Carbon | | | | | | |
| Density C aerogel (g/cc) | 0.095 | 0.115 | 0.118 | 0.132 | 0.128 | 0.118 |
| BET surface area, m²/g | 405.4 | 595.5 | 586.7 | 589.0 | 598.4 | 594.2 |
| Micropore area, m²/g | 93.9 | | 124.5 | 109.3 | 113.4 | 119.5 |
| Pore volume, cm³/g | 0.92 | 1.63 | 1.52 | 2.03 | 5.90 | 1.35 |
| Skeletal density, g/cc | 2.492 | 2.505 | 2.495 | 2.210 | 2.273 | 2.208 |
| linear Shrinkage (%) | 31.0 | 23.9 | 24.9 | 25.6 | 25.5 | 25.6 |
| Carbonization yield (%) | 40.5 | 43.0 | 43.3 | 45.3 | 44.8 | 44.7 |

FIG. 5

| Py/PMDA = 0.45 | Water/PMDA molar ratio | | | | |
|---|---|---|---|---|---|
| PI | 0 | 5 | 10 | 20 | 35 |
| Density PI aerogel, g/cc | 0.100 | 0.109 | 0.123 | 0.118 | 0.148 |
| BET surface area, m²/g | 501.8 | 497.6 | 583.7 | 538.5 | 498.1 |
| Micropore area, m²/g | 134.0 | 140.6 | 146.2 | 138.9 | 149.1 |
| Pore volume, cm³/g | 1.10 | 0.95 | 1.73 | 1.30 | 0.91 |
| linear Shrinkage (%) | 20.5 | 23.8 | 25.7 | 24.9 | 23.5 |
| Carbon | | | | | |
| Density C aerogel (g/cc) | 0.144 | 0.125 | 0.166 | 0.150 | 0.138 |
| BET surface area, m²/g | 561.2 | 582.5 | 651.9 | 643.3 | 619.9 |
| Micropore area, m²/g | 127.6 | 129.8 | 119.9 | 130.2 | 126.3 |
| Pore volume, cm³/g | 2.06 | 2.22 | 3.86 | 4.14 | 2.07 |
| Skeletal density, g/cc | 2.132 | 2.131 | 2.137 | 2.139 | 2.139 |
| linear Shrinkage (%) | 32.5 | 30.0 | 31.0 | 29.6 | 29.5 |
| Carbonization yield (%) | 44.5 | 41.8 | 44.3 | 43.6 | 32.6 | x 200k x 200k x 100k x 100k x 50k

Py/PMDA = 0.45
$H_2O$/PMDA = 0 x 50k

Py/PMDA = 0.45
$H_2O$/PMDA = 10

× 200k

× 100k

× 50k

Py/PMDA = 0.45
H₂O/PMDA = 10

FIG. 15

|  | Example 1 | Example 2 | | Example 3 | Example 4 | | | Example 5 | | Example 6 | Example 7 | | Example 8.1 |
| --- | --- | --- | --- | --- | --- | --- | --- | --- | --- | --- | --- | --- | --- |
|  |  | 2.1 | 2.2 |  | 4.1 | 4.2 | 4.3 | 5.1 | 5.2 |  | 7.1 | 7.2 |  |
| Dianhydride | PMDA | PMDA | PMDA | PMDA | PMDA | PMDA | PMDA | PMDA | PMDA | BTDA | BTDA | BTDA | BPDA |
| Pyridine/ dianhydride molar ratio | 1 | 2 | 4 | 1 | 0.45 | 0.25 | 2 | 0.25 | 0.45 | 0.52 | 0.24 | 0.52 | 0.92 |
| H₂O/ dianhydride molar ratio | 0 | 0 | 0 | 35 | 20 | 10 | 15 | 10 | 5 | 0 | 36 | 54 | 35 |
| $T_d$ (g/cm³) | 0.05 | 0.05 | 0.05 | 0.05 | 0.05 | 0.05 | 0.05 | 0.1 | 0.1 | 0.14 | 0.14 | 0.14 | 0.09 |
| Gel Time (min) | 90 | 38 | 26 | 3.5 | 11 | 97 | 8.2 | 2.3 | 5 | 68 | 12 | 3 | 12 |

FIG. 16

| | Example 1 | Example 2 | | Example 3 | Example 4 | | | Example 5 | | Example 6 | Example 7 | |
|---|---|---|---|---|---|---|---|---|---|---|---|---|
| | | 2.1 | 2.2 | | 4.1 | 4.2 | 4.3 | 5.1 | 5.2 | | 7.1 | 7.2 |
| *Polyimide* | | | | | | | | | | | | |
| Linear shrinkage, % | 21.4 | 21.4 | 18.0 | 21.0 | 24.9 | 20.3 | 21.4 | 23.5 | 22.0 | 14.9 | 15.7 | 16.2 |
| $\rho_b$ (g/cm$^3$) | 0.104 | 0.105 | 0.093 | 0.111 | 0.118 | 0.085 | 0.105 | 0.212 | 0.202 | 0.148 | 0.072 | 0.136 |
| *After carbonization* | | | | | | | | | | | | |
| Linear shrinkage, % | 35.6 | 31.1 | 32.6 | 25.7 | 29.6 | 31.0 | 31.1 | 29.7 | 30.3 | 54.6 | 45.1 | 47.9 |
| Carbonization yield, % | 38.5 | 43.5 | 35.5 | 37.8 | 43.6 | 40.5 | 43.5 | 53.3 | 54.5 | 51.0 | 53.6 | 50.1 |
| $\rho_b$ (g/cm$^3$) | 0.211 | 0.137 | 0.145 | 0.111 | 0.150 | 0.095 | 0.137 | 0.336 | 0.334 | 0.786 | 0.255 | 0.448 |

WATER CO-CATALYST FOR POLYIMIDE PROCESSES

CROSS-REFERENCE TO RELATED APPLICATIONS

This application claims priority to U.S. Provisional Patent Application No. 63/124,454, filed Dec. 11, 2020, and which is herein incorporated by reference in its entirety.

TECHNICAL FIELD

The present disclosure relates generally to porous polyimide materials and processes for making the same using water as a co-catalyst in the dehydration of a polyamic acid.

BACKGROUND

Aerogels are solid materials that include a highly porous network of micro-sized and meso-sized pores. Depending on precursor materials used and processing undertaken, the pores of an aerogel can frequently account for over 90% of the volume when the density of the aerogel about 0.05 g/cc. Aerogels are generally prepared by removing the solvent from a gel (a solid network that contains its solvent) in a manner such that minimal or no contraction of the gel can be brought by capillary forces at its surface. Methods of solvent removal include, but are not limited to, supercritical drying (or drying using supercritical fluids, such that the low surface tension of the supercritical fluid exchanges with the transient solvent within the gel), exchange of solvent with supercritical fluid, exchange of solvent with fluid that subsequently transformed to supercritical state, sub- or near-critical drying, and sublimating a frozen solvent in a freeze-drying process. See for example, PCT Patent Application Publication No. WO2016127084A1. It should be noted that when drying in ambient conditions, gel contraction may take place with solvent evaporation, and a xerogel can form. Therefore, aerogel preparation through a sol-gel process or other polymerization processes typically proceeds in the following series of steps: dissolution of the solute in a solvent, formation of the sol/solution/mixture, formation of the gel (may involve additional cross-linking), and solvent removal by a supercritical drying technique or any other method that removes solvent from the gel without causing pore collapse.

Aerogels can be formed of inorganic materials, organic materials, or mixtures thereof. When formed of organic materials such as, for example, phenols, resorcinol-formaldehyde (RF), phloroglucinol-furfuraldehyde (PF), polyacrylonitrile (PAN), polyimide (PI), polyurethane (PU), polyurea (PUA), polyamine (PA), polybutadiene, polydicyclopentadiene, and precursors or polymeric derivatives thereof, the organic aerogel may be carbonized (e.g., by pyrolysis) to form a carbon aerogel, which can have properties (e.g., pore volume, pore size distribution, morphology, etc.) that differ or overlap from each other, depending on the precursor materials and methodologies used.

Recently, there has been effort devoted to the development and characterization of carbon aerogels as electrode materials with improved performance for applications in energy storage devices, such as lithium-ion batteries (LIBs). Consequently, there is a demand for the corresponding organic aerogels, such as polyimide aerogels. Polyimide aerogels are generally prepared by allowing a diamine and a tetracarboxylic anhydride to react in an organic solvent, followed by dehydrating the resulting polymeric amido acid ("polyamic acid") in the presence of a monoamine to form a polyimide gel. For economic, safety, environmental, and practical reasons, it would be desirable to carry out such gelation using the minimum amount of the monoamine, and for the gelation to occur as rapidly as possible.

SUMMARY

The present technology is generally directed to a method of forming polyimide gels while minimizing the use of potentially harmful or noxious reagents. The method is further advantageous in providing rapid gelation, making the method amenable to configuration in a continuous process, for example, in preparing polyimide beads. The method generally comprises providing a polyamic acid and subsequently dehydrating the polyamic acid, where the dehydrating is performed in the presence of water. Surprisingly, according to the present disclosure, it was found that the dehydration occurred in the presence of water without appreciable decomposition of the dehydrating agent, and in fact occurred more rapidly when water was present as a co-catalyst.

Accordingly, in one aspect is provided a method of forming a polyimide gel, the method comprising:
a) providing a tetracarboxylic acid dianhydride and a multifunctional amine;
b) adding the tetracarboxylic acid dianhydride and the multifunctional amine to an organic solvent to form a solution;
c) allowing the tetracarboxylic acid dianhydride and the multifunctional amine to react in solution, forming a solution of a polyamic acid sol;
d) adding a dehydrating agent, a monoamine, and water to the solution of the polyamic acid sol to form the polyimide gel.

In some embodiments, the tetracarboxylic acid dianhydride is selected from the group consisting of pyromellitic anhydride (PMDA), biphthalic dianhydride (BPDA), oxydiphthalic dianhydride (ODPA), benzophenone tetracarboxylic dianhydride (BTDA), ethylenediaminetetraacetic dianhydride (EDDA), 1,4,5,8-naphthalenetetracarboxylic dianhydride, and combinations thereof.

In some embodiments, the multifunctional amine is 1,3,5-tris(4-aminophenoxy)benzene (TAPOB), tris(4-aminophenyl)methane, melamine, or a combination thereof.

In some embodiments, the multifunctional amine is an alkane diamine or an aryl diamine. In some embodiments, the alkane diamine is ethylenediamine, 1,3-diaminopropane, 1,4-diaminobutane, 1,5-diaminopentane, 1,6-diaminohexane, or a combination thereof. In some embodiments, the aryl diamine is 1,4-phenylenediamine, 4,4'-diaminodiphenyl ether, 4,4'-methylenedianiline, or a combination thereof.

In some embodiments, a molar ratio of the tetracarboxylic acid dianhydride to the multifunctional amine is from about 0.9 to about 3, or from about 0.9 to about 1.1.

In some embodiments, a molar ratio of the monoamine to the polyamic acid is from about 0.1 to about 8. In some embodiments, a quantity of the monoamine required to be added to achieve formation of the polyimide gel with a gelation time under about 15 minutes is reduced by up to about 50-fold relative to a method of forming a polyimide gel in the absence of water.

In some embodiments, the monoamine is a tertiary alkyl amine, a tertiary cycloalkyl amine, a heteroaromatic amine, a guanidine, or a quaternary ammonium hydroxide. In some embodiments, the monoamine is selected from the group consisting of trimethylamine, triethylamine, tri-n-propylamine, tri-n-butylamine, N-methylpyrrolidine, N-methylpiperidine, diisopropylethylamine, pyridine, quinoline, guanidine, and a tetraalkylammonium hydroxide. In some embodiments, the monoamine is pyridine.

In some embodiments, a molar ratio of the dehydrating agent to the tetracarboxylic acid dianhydride is from about 2 to about 10, from about 3 to about 6, or from about 4 to about 5.

In some embodiments, the dehydrating agent is a carboxylic acid anhydride. In some embodiments, the carboxylic acid anhydride is acetic anhydride.

In some embodiments, the organic solvent is N,N-dimethylacetamide, N,N-dimethylformamide, N-methylpyrrolidone, tetrahydrofuran, or ethyl acetate.

In some embodiments, a molar ratio of the water to the tetracarboxylic acid dianhydride is greater than about 5. In some embodiments, a molar ratio of the water to the tetracarboxylic acid dianhydride is from about 5 to about 500.

In some embodiments, a range of concentration of the polyamic acid sol in the solution is from about 0.01 to about 0.3 g/cm$^3$.

In some embodiments, the multifunctional amine and the tetracarboxylic acid dianhydride are allowed to react for a period of time from about 0.5 hour to about 17 hours.

In some embodiments, the multifunctional amine and the tetracarboxylic acid dianhydride are allowed to react at a temperature from about 10 to about 100° C., from about 15 to about 60° C., from about 15 to about 50° C., or from about 15 to about 25° C.

In some embodiments, a length of time from addition of the monoamine and water until gelation of the polyimide is less than about 1 minute, or less than about 30 seconds, or less than about 15 seconds.

In some embodiments, the method further comprises:
a. casting the polyamic sol in a mold to form a polyimide wet-gel monolith;
b. demolding the polyimide wet-gel monolith;
c. washing or solvent exchanging the polyimide wet-gel monolith; and
d. drying the polyimide wet-gel monolith to form a monolithic polyimide aerogel or xerogel.

In some embodiments, the monolith has a thickness from about 5 to about 25 mm. In some embodiments, the monolith is a film having a thickness from about 50 microns to about 1 mm.

In some embodiments, the washing or solvent exchanging is performed with water, a C1 to C3 alcohol, acetone, acetonitrile, tetrahydrofuran, ethyl acetate, supercritical fluid carbon dioxide ($CO_2$), or a combination thereof.

In some embodiments, drying comprises lyophilizing the polyimide wet-gel, or contacting the polyimide wet-gel with supercritical fluid $CO_2$.

In some embodiments, the method further comprises carbonizing the monolithic polyimide aerogel or xerogel to form a carbon aerogel or xerogel. In some embodiments, the carbon aerogel has substantially the same properties as a carbon aerogel prepared by carbonizing a corresponding polyimide wet-gel that has been prepared by an imidization method which does not include water.

In some embodiments, the method further comprises casting polyimide beads in an emulsion. In some embodiments, casting polyimide beads in an emulsion comprises:
a. adding the polyamic sol solution to mineral oil, silicone oil, or a C5-C12 hydrocarbon (e.g., hexane or mineral spirits) prior to gelation to form a mixture; and
b. stirring the mixture under high-shear conditions to form polyimide beads having a diameter from about 5 microns to about 200 microns.

In some embodiments, the method further comprises adding one or more surfactants to the mixture.

In some embodiments, the method further comprises drying the polyimide beads under elevated temperature conditions or with supercritical fluid $CO_2$.

In some embodiments, the method further comprises casting polyimide beads as an aerosol, the method comprising spraying the polyamic sol solution, prior to gelation, into air or into mineral oil, silicone oil, a C5-C12 hydrocarbon, or mineral spirits, to form polyimide beads having a diameter from about 5 microns to about 250 microns.

In some embodiments, the method is carried out as a continuous process, the continuous process further comprising conveying the polyimide beads through one or more of: filtering; aging; solvent exchanging; drying; carbonizing.

In some embodiments, the method further comprises adding silicon to the polyamic acid prior to dehydration or prior to gelation.

In a further aspect is provided a polyimide wet-gel prepared by the method disclosed herein.

In some embodiments, the polyimide wet-gel comprises terminal amine groups as determined by $^{15}$N-NMR.

In some embodiments, the wet-gel is doped with silicon.

In a still further aspect is provided a nanoporous aerogel material comprising a pore structure, the pore structure comprising a fibrillar morphology and an array of pores.

In some embodiments, the nanoporous aerogel material is a polyimide aerogel, or wherein the nanoporous aerogel material is a carbon aerogel derived from a polyimide aerogel.

BRIEF DESCRIPTION OF THE DRAWINGS

In order to provide an understanding of embodiments of the technology, reference is made to the appended drawings, which are not necessarily drawn to scale. The drawings are exemplary only, and should not be construed as limiting the technology. The disclosure described herein is illustrated by way of example and not by way of limitation in the accompanying figures.

FIG. 4 is a table providing the physical and structural properties of carbon aerogels from the carbonization of the polyimide aerogels synthesized according to non-limiting embodiments of the disclosure.

FIG. 5 is a table providing the physical and structural properties of carbon aerogels from the carbonization of the polyimide aerogels synthesized according to non-limiting embodiments of the disclosure.

FIG. 15 is a table providing the sol-gel compositions for each of the gels synthesized according to non-limiting embodiments of the disclosure.

FIG. 16 is a table providing the physical and structural properties of the polyimide aerogels synthesized according to non-limiting embodiments of the disclosure.

DETAILED DESCRIPTION

Figure 1:
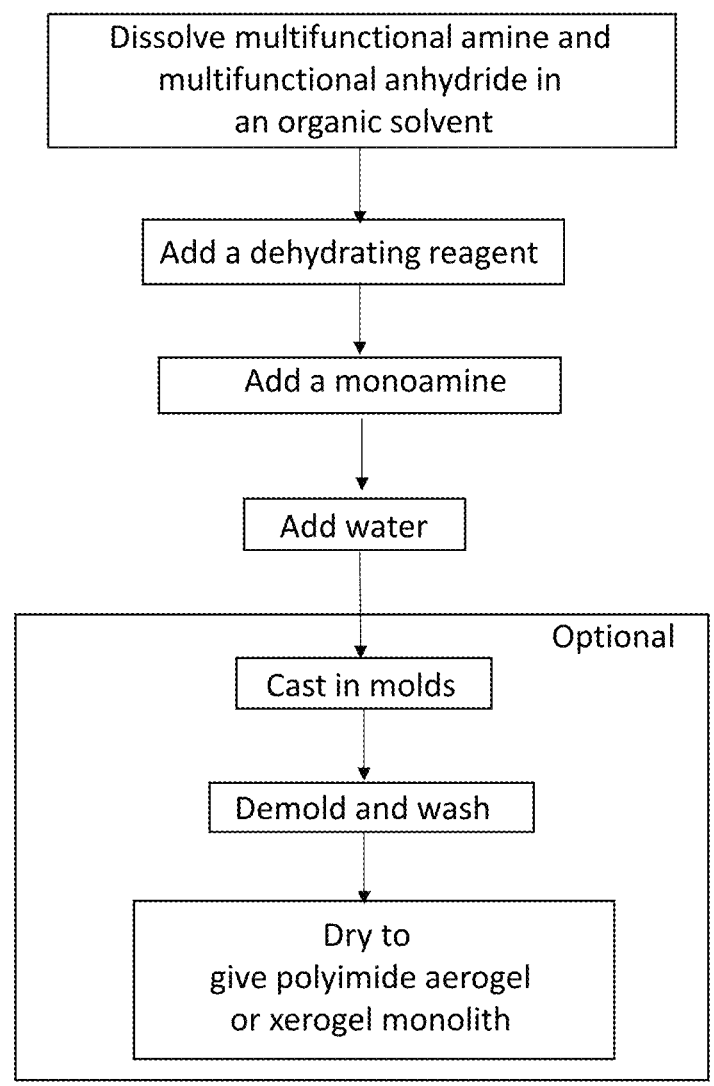
FIG. 1 is flow chart depicting a non-limiting embodiment of the disclosed method.

Before describing several example embodiments of the technology, it is to be understood that the technology is not limited to the details of construction or process steps set forth in the following description. The technology is capable of other embodiments and of being practiced or being carried out in various ways.

The method generally comprises providing a polyamic acid and subsequently dehydrating the polyamic acid, where the dehydrating is performed in the presence of water as a co-catalyst. Surprisingly, according to the present disclosure, it was found that not only did the dehydration proceed in the presence of water, and without the expected destruction of the dehydrating reagent (e.g., an acid anhydride such as acetic anhydride), but also the gelation of the polyimide occurred very rapidly. The resulting polyimide wet-gels may be converted to aerogels. When the polyimide wet-gels are converted to carbon aerogels, the carbon aerogels possess nanostructures with similar properties to carbonized polyimide aerogels in which the corresponding polyimide wet-gels are prepared by the conventional dehydration process (e.g., without water and using a large excess of a monoamine, such as pyridine). The present method is preferable to the conventional dehydration process due to the avoidance of large quantities of noxious and toxic reagents (such as pyridine) and the disposal thereof. Further, the rapid gelation makes the method suitable for use in continuous processes for production of polyimide gel materials, e.g., in the production of polyimide beads.

Definitions

With respect to the terms used in this disclosure, the following definitions are provided. This application will use the following terms as defined below unless the context of the text in which the term appears requires a different meaning The articles "a" and "an" are used herein to refer to one or to more than one (i.e., to at least one) of the grammatical object of the article. The term "about" used throughout this specification is used to describe and account for small fluctuations. For example, the term "about" can refer to less than or equal to ±10%, less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

Within the context of the present disclosure, the terms "framework" or "framework structure" refer to the network of interconnected oligomers, polymers, or colloidal particles that form the solid structure of a gel or an aerogel. The polymers or particles that make up the framework structures typically have a diameter of about 100 angstroms. However, framework structures of the present disclosure can also include networks of interconnected oligomers, polymers, or colloidal particles of all diameter sizes that form the solid structure within in a gel or aerogel.

As used herein, the term "aerogel" refers to a solid object, irrespective of shape or size, comprising a framework of interconnected solid structures, with a corresponding network of interconnected pores integrated within the framework, and containing gases such as air as a dispersed interstitial medium. As such, and irrespective of the drying method used, aerogels are open non-fluid colloidal or polymer networks that are expanded throughout their whole volume by a gas, and are formed by the removal of all swelling agents from a corresponding wet-gel. Reference to an "aerogel" herein includes any open-celled porous materials which can be categorized as aerogels, xerogels, cryogels, ambigels, microporous materials, and the like, regardless of material (e.g., polyimide, polyamic acid, or carbon), unless otherwise stated.

Generally, aerogels possess one or more of the following physical and structural properties: (a) an average pore diameter ranging from about 2 nm to about 100 nm; (b) a porosity of about 60% or more; (c) a specific surface area of about 0 to about 100 $m^2$/g or more, typically from about 0 to about 20, about 0 to about 100, or from about 100 to about 1000 $m^2$/g. Typically, such properties are determined using nitrogen porosimetry testing and/or helium pycnometry. It can be understood that the inclusion of additives, such as a reinforcement material or an electrochemically active species, for example, silicon, may decrease porosity and the specific surface area of the resulting aerogel composite. Densification may also decrease porosity of the resulting aerogel.

In some embodiments, a gel material may be referred to specifically as a xerogel. As used herein, the term "xerogel" refers to a type of aerogel comprising an open, non-fluid colloidal or polymer networks that is formed by the removal of all swelling agents from a corresponding gel without any precautions taken to avoid substantial volume reduction or to retard compaction. A xerogel generally comprises a compact structure. Xerogels suffer substantial volume reduction during ambient pressure drying, and generally have surface areas of 0-100 $m^2/g$, such as from about 0 to about 20 $m^2/g$ as measured by nitrogen sorption analysis.

As used herein, reference to a "conventional" method of dehydrating a polyamic acid refers to a method in which a polyamic acid is prepared in an organic solvent solution from condensation of a diamine and a tetracarboxylic acid dianhydride, and dehydration of the polyamic acid using large excesses of pyridine in the presence of acetic anhydride. See, for example, U.S. Pat. Nos. 7,071,287 and 7,074,880 to Rhine et al., and U.S. Patent Application Publication No. 2020/0269207 to Zafiropoulos, et al.

As used herein, the term "gelation" or "gel transition" refers to the formation of a wet-gel from a polymer system, e.g., a polyimide or polyamic acid as described herein. At a point in the polymerization or dehydration reactions as described herein, which is defined as the "gel point," the sol loses fluidity. Without intending to be bound to any particular theory, the gel point may be viewed as the point where the gelling solution exhibits resistance to flow. In the present context, gelation proceeds from an initial sol state, where the solution comprises primarily the amine salt of the polyamic acid, through a fluid colloidal dispersion state, until sufficient polyimide has formed to reach the gel point. Gelation may continue thereafter, producing a polyimide wet-gel dispersion of increasing viscosity. The amount of time it takes for the polymer (i.e., polyamic acid and/or polyimide) in solution to transform into a gel in a form that can no longer flow is referred to as the "phenomenological gelation time." Formally, gelation time is measured using rheology. At the gel point, the elastic property of the solid gel starts dominating over the viscous properties of the fluid sol. The formal gelation time is near the time at which the real and imaginary components of the complex modulus of the gelling sol cross. The two moduli are monitored as a function of time using a rheometer. Time starts counting from the moment the last component of the sol is added to the solution. See, for example, discussions of gelation in H. H. Winter "Can the Gel Point of a Cross-linking Polymer Be Detected by the G'-G" Crossover?" Polym. Eng. Sci., 1987, 27, 1698-1702; S.-Y. Kim, D.-G. Choi and S.-M. Yang "Rheological analysis of the gelation behavior of tetraethylorthosilane/vinyltriethoxysilane hybrid solutions" Korean J. Chem. Eng., 2002, 19, 190-196; and M. Muthukumar "Screening effect on viscoelasticity near the gel point" Macromolecules, 1989, 22, 4656-4658.

As used herein, the term "wet-gel" refers to a gel in which the mobile interstitial phase within the network of interconnected pores is primarily comprised of a liquid phase such as a conventional solvent, liquefied gases such as liquid carbon dioxide, or a combination thereof. Aerogels typically require the initial production of a wet-gel, followed by processing and extraction to replace the mobile interstitial liquid phase in the gel with air or another gas. Examples of wet-gels include, but are not limited to: alcogels, hydrogels, ketogels, carbonogels, and any other wet-gels known to those in the art.

The term "alkyl" as used herein refers to a straight chain or branched, saturated hydrocarbon group generally having from 1 to 20 carbon atoms (i.e., C1 to C20). Representative alkyl groups include, but are not limited to, methyl, ethyl, n-propyl, n-butyl, n-pentyl, and n-hexyl; while branched alkyl groups include, but are not limited to, isopropyl, sec-butyl, isobutyl, tert-butyl, isopentyl, and neopentyl. An alkyl group can be unsubstituted or substituted.

The term "alkenyl" as used herein refers to a hydrocarbon group generally having from 1 to 20 carbon atoms (i.e., C1 to C20), and having at least one site of unsaturation, i.e., a carbon-carbon double bond. Examples include, but are not limited to: ethylene or vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like. An alkenyl group can be unsubstituted or substituted.

The term "alkynyl" as used herein refers to a hydrocarbon group generally having from 1 to 20 carbon atoms (i.e., C1 to C20), and having at least one carbon-carbon triple bond. Examples of alkynyl groups include, but are not limited to ethynyl and propargyl. An alkynyl group can be unsubstituted or substituted.

The term "aryl" as used herein refers to aromatic carbocyclic group generally having from 6 to 20 carbon atoms (i.e., C6 to C20). Examples of aryl groups include, but are not limited to, phenyl, naphthyl, and anthracenyl. An aryl group can be unsubstituted or substituted.

The term "cycloalkyl" as used herein refers to a saturated carbocyclic group, which may be mono- or bicyclic. Cycloalkyl groups include a ring having 3 to 7 carbon atoms (i.e., C3 to C7) as a monocycle, or 7 to 12 carbon atoms (i.e., C7 to C12) as a bicycle. Examples of monocyclic cycloalkyl groups include cyclopropyl, cyclobutyl, cyclopentyl, cyclohexyl, cycloheptyl, and cyclooctyl. A cycloalkyl group can be unsubstituted or substituted.

The term "substituted" as used herein and as applied to any of the above groups (alkyl, alkenyl, alkynyl, aryl, cycloalkyl, and the like), means that one or more hydrogen atoms of said group are each independently replaced with a substituent. Typical substituents include, but are not limited to, —X, —R, —OH, —OR, —SH, —SR, $NH_2$, —NHR, —$N(R)_2$, —$N^+(R)_3$, —$CX_3$, —CN, —OCN, —SCN, —NCO, —NCS, —NO, —$NO_2$, —$N_3$, —NC(=O)H, —NC(=O)R, —C(=O)H, —C(=O)R, —C(=O)$NH_2$, —C(=O)$N(R)_2$, —$SO_3$—, —$SO_3H$, —S(=$O)_2R$, —OS(=$O)_2OR$, —S(=$O)_2NH_2$, —S(=$O)_2N(R)_2$, —S(=O)R, —OP(=O)$(OH)_2$, —OP(=O)$(OR)_2$, —P(=O)$(OR)_2$, —$PO_3$, —$PO_3H_2$, —C(=O)X, —C(=S)R, —$CO_2H$, —$CO_2R$, —$CO_2$—, —C(=S)OR, —C(=O)SR, —C(=S)SR, —C(=O)$NH_2$, —C(=O)$N(R)_2$, —C(=S)$NH_2$, —C(=S)$N(R)_2$, —C(=NH)$NH_2$, and —C(=NR)$N(R)_2$; wherein each X is independently selected for each occasion from F, Cl, Br, and I; and each R is independently selected for each occasion from $C_1$-$C_{20}$ alkyl and $C_6$-$C_{20}$ aryl. Wherever a group is described as "optionally substituted," that group can be substituted with one or more of the above substituents, independently for each occasion.

It is to be understood that certain naming conventions can include various attachment scenarios, depending on the context. For example, where a substituent requires two points of attachment to the rest of the molecule, it is understood that the substituent is bidentate. For example, a substituent identified as alkyl but that requires two points of attachment includes forms such as —$CH_2$—, —$CH_2CH_2$—, —$CH_2CH(CH_3)CH_2$—, and the like. Other naming conventions clearly indicate that a group is bidentate, such as "alkylene," "alkenylene," "arylene," and the like. Wherever a substituent is bidentate, it is to be understood that the substituent can be attached in any directional configuration unless otherwise indicated.

The term "substantially" as used herein, unless otherwise indicated, means to a great extent, for example, greater than about 95%, greater than about 99%, greater than about 99.9%, greater than 99.99%, or even 100% of a referenced characteristic, quantity, etc. as pertains to the particular context (e.g., substantially pure, substantially the same, and the like).

Method of Forming Aerogels and Xerogels

The disclosure generally provides methods of preparing polyimide gels, including aerogels and xerogels, as well as the corresponding carbonized materials. As a non-limiting general method, the production of an aerogel or xerogel generally includes the following steps: i) formation of a solution containing a gel precursor; ii) formation of a wet-gel from the gel precursor solution; and iii) aging and solvent exchange of the wet-gel, and iv) extracting the solvent from the wet-gel, under critical or ambient conditions to obtain a dried aerogel or xerogel material, respectively. These steps are discussed below in greater detail, specifically in the context of forming organic aerogels, such as polyimide aerogel, and the corresponding carbon aerogels.

Polyimide Wet-Gels

In one aspect of the disclosure is provided a method of forming a polyimide gel by the dehydration of a polyamic acid in the presence of water as a co-catalyst. With reference to FIG. 1, the method generally comprises combining at least one multifunctional amine and at least one multifunctional anhydride in a solvent to form a solution, and adding a dehydrating reagent, a monoamine, and water to the solution. The order of addition of reagents may vary. In some embodiments, the order of addition follows the sequence illustrated in the exemplary flowchart of FIG. 1. Accordingly, with reference to FIG. 1, in some embodiments, one or more multifunctional amines and one or more multifunctional anhydrides are dissolved in an organic solvent.

The term "multifunctional amine" as used herein refers to a molecule having at least two primary amino groups available for reaction as described herein below. In some embodiments, triamines, tetramines, pentamines, hexamines, and the like may be used instead of or in addition to the diamine in order to optimize the properties of the gel material. In some embodiments, the multifunctional amine comprises a triamine or is a triamine. Non-limiting examples of suitable triamines include propane-1,2,3-triamine, benzene-1,3,5-triamine, cyclohexane-1,3,5-triamine, 1,3,5-tris(4-aminophenoxy)benzene (TAPOB), tris(4-aminophenyl)methane, and 1,3,5-triazine-2,4,6-triamine (melamine). In some embodiments, the multifunctional amine is 1,3,5-tris(4-aminophenoxy)benzene (TAPOB), tris(4-aminophenyl)methane, melamine, or a combination thereof. In some embodiments, the multifunctional amine is melamine. In preferred embodiments, the multifunctional amine is a diamine. Suitable diamines are described further herein below.

For the sake of clarity and simplicity, the method is described further herein below with respect to embodiments wherein the multifunctional amine is a diamine. However, it is to be understood that this is one non-limiting embodiment, and the method may be carried out using other multifunctional amines as described herein above. One of skill in the art will recognize multifunctional amines which may be suitable for use in the presently disclosed methods as an alternative to or in addition to the diamines further described herein.

The term "multifunctional anhydride" refers to a molecule having at least two dicarboxylic acid anhydride groups available for reaction as described herein below. In some embodiments, the multifunctional anhydride is a tetracarboxylic acid dianhydride. In some embodiments, trianhydrides, tetraanhydrides, pentaanhydrides, hexaanhydrides, and the like may be used instead of or in addition to the tetracarboxylic acid dianhydride in order to optimize the properties of the gel material.

For the sake of clarity and simplicity, the method is described further herein below with respect to embodiments wherein the multifunctional anhydride is a tetracarboxylic acid dianhydride. However, it is to be understood that this is one non-limiting embodiment, and the method may be carried out using other multifunctional anhydrides as described herein above. One of skill in the art will recognize multifunctional anhydrides which may be suitable for use in the presently disclosed methods as an alternative or in addition to the dianhydrides further described herein.

Accordingly, in some embodiments, the method comprises: providing a tetracarboxylic acid dianhydride and a multifunctional amine; adding the tetracarboxylic acid dianhydride and the multifunctional amine to an organic solvent to form a solution; allowing the tetracarboxylic acid dianhydride and the multifunctional amine to react in solution, forming a solution of a polyamic acid sol; adding a dehydrating agent, a monoamine, and water to the solution of the polyamic acid sol to form the polyimide gel.

Generally, the diamine is allowed to react with the tetracarboxylic acid dianhydride to initially form a polyamic acid, which is subsequently dehydrated with the dehydrating agent in the presence of water and a monamine to form the polyimide as a wet-gel.

The organic solvent may vary, but is generally polar and aprotic. Suitable solvents include, but are not limited to, N,N-dimethylacetamide, N,N-dimethylformamide, and N-methylpyrrolidone. In some embodiments, the solvent is N,N-dimethylacetamide.

A non-limiting generic reaction sequence is provided in Scheme 1. In some embodiments, the reactions occur generally according to Scheme 1, and the reagents, intermediates, and product have structures according to the formulae in Scheme 1.

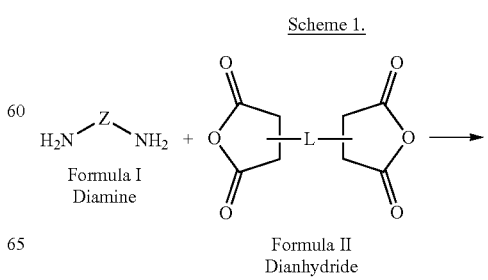

Scheme 1.

Formula I
Diamine

Formula II
Dianhydride

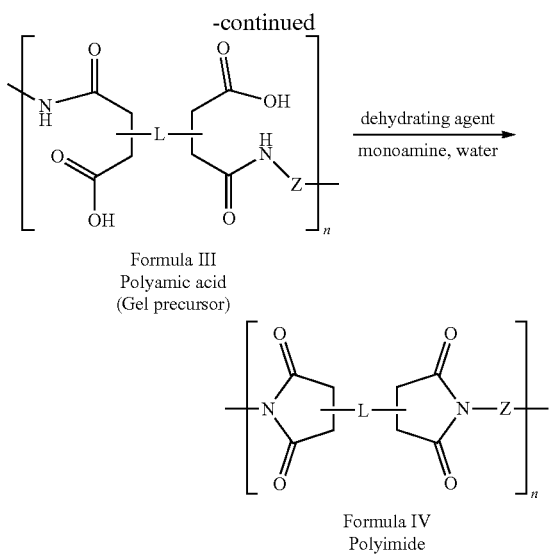

Formula III
Polyamic acid
(Gel precursor)

Formula IV
Polyimide

With reference to Scheme 1 and FIG. 1, a diamine is dissolved in the organic solvent. In some embodiments, combinations of more than one diamine may be used. Combinations of diamines may be used in order to optimize the properties of the gel material. In some embodiments, a single diamine is used.

The structure of the diamine may vary. In some embodiments, the diamine has a structure according to Formula I, where Z is aliphatic (i.e., alkylene, alkenylene, alkynylene, or cycloalkylene) or arylene, each as described herein above.

In some embodiments, Z is alkylene, such as C2 to C12 alkylene (i.e., having from 2 to 12 carbon atoms). In some embodiments, the diamine is a C2 to C6 alkane diamine, such as, but not limited to, ethylenediamine, 1,3-diaminopropane, 1,4-diaminobutane, 1,5-diaminopentane, or 1,6-diaminohexane. In some embodiments, one or more of carbon atoms of the C2 to C6 alkane of the diamine is substituted with one or more alkyl groups, such as methyl.

In some embodiments, Z is arylene. In some embodiments, the arylene diamine is 1,4-phenylenediamine (PDA), 4,4'-diaminodiphenyl ether, 4,4'-methylenedianiline, or a combination thereof. In some embodiments, the diamine is PDA. In some embodiments, the diamine is 4,4'-diaminodiphenyl ether. In some embodiments, the diamine is 4,4'-methylenedianiline.

With reference to Scheme 1 and FIG. 1, a tetracarboxylic acid dianhydride is added. In some embodiments, more than one tetracarboxylic acid dianhydride is added. Combinations of tetracarboxylic acid dianhydrides may be used in order to optimize the properties of the gel material. In some embodiments, a single tetracarboxylic acid dianhydride is added.

The structure of the tetracarboxylic acid dianhydride may vary. In some embodiments, the tetracarboxylic acid dianhydride has a structure according to Formula II, where L comprises an alkyl group, a cycloalkyl group, an aryl group, or a combination thereof, each as described herein above. In some embodiments, L comprises an aryl group. In some embodiments, L comprises a phenyl group, a biphenyl group, or a diphenyl ether group. In some embodiments, the tetracarboxylic acid dianhydride of Formula II has a structure selected from one or more structures as provided in Table 1.

TABLE 1

| Non-limiting list of potential tetracarboxylic acid dianhydrides | | |
|---|---|---|
| Structure | IUPAC Name | Common/Alternative Name |
| | 1H,3H-benzo[1,2-c:4,5-c']difuran-1,3,5,7-tetraone | pyromellitic anhydride (PMDA) |
| | [5,5'-biisobenzofuran]-1,1',3,3'-tetraone | 3,3',4,4'-bisphenyltetracarboxylic dianhydride; biphthalic dianhydride (BPDA) |
| | 5,5'-oxybis(isobenzofuran-1,3-dione) | 4,4'-oxydiphthalic dianhydride (ODPA) |

TABLE 1-continued

Non-limiting list of potential tetracarboxylic acid dianhydrides

| Structure | IUPAC Name | Common/Alternative Name |
|---|---|---|
| | 5,5'-(propane-2,2-diyl)bis(isobenzofuran-1,3-dione) | 4,4'-(isopropylidene)diphathalic dianhydride |
| | 5,5'-(perfluoropropane-2,2-diyl)bis(isobenzofuran-1,3-dione) | 4,4'-(hexafluoroisopropylidene)diphathalic dianhydride (6FDA) |
| | 5,5'-carbonylbis(isobenzofuran-1,3-dione) | 3,3',4,4'-benzophenonetetracarboxylic dianhydride (BTDA) |
| | 5,5'-sulfonylbis(isobenzofuran-1,3-dione) | 3,3',4,4'-diphenylsulfonetetracarboxylic dianhydride |
| | isochromeno[6,5,4-def]isochromene-1,3,6,8-tetraone | 1,4,5,8-Naphthalenetetracarboxylic dianhydride |
| | anthra[2,1,9-def:6,5,10-d'e'f']diisochromene-1,3,8,10-tetraone | perylene tetracarboxylic acid |
| | 5-(2-(4-((1,3-dioxo-1,3-dihydroisobenzofuran-5-yl)oxy)phenyl)propan-2-yl)isobenzofuran-1,3-dione | |
| | 5,5'-((propane-2,2-diylbis(4,1-phenylene))bis(oxy))bis(isobenzofuran-1,3-dione) | 4,4'-(4,4')-isopropylidenediphenoxy)bisphthalic dianhydride (BPADA) |

In some embodiments, the tetracarboxylic acid dianhydride is selected from the group consisting of pyromellitic anhydride (PMDA), biphthalic dianhydride (BPDA), oxydiphthalic dianhydride (ODPA), benzophenone tetracarboxylic dianhydride (BTDA), ethylenediaminetetraacetic dianhydride (EDDA), 1,4,5,8-naphthalenetetracarboxylic dianhydride, and combinations thereof. In some embodiments, the tetracarboxylic acid dianhydride is PMDA.

With reference to Scheme 1, the multifunctional amine and the multifunctional anhydride (e.g., diamine and dianhydride) are allowed to react with each other, forming a gel precursor of Formula III, which is referred to herein as a polyamic acid.

The molecular weight of the polyamic acid and the corresponding polyimide may vary based on reaction conditions (e.g., concentration, temperature, duration of reaction, nature of diamine and dianhydride, etc.). The molecular weight is based on the number of polyamic acid repeat units, as denoted by the value of the integer "n" for the structure of Formula III and IV in Scheme 1. A repeat unit as defined herein is a part of the polyamic acid or polyimide whose repetition would produce the complete polymer chain (except for the terminal amino groups) by linking the repeat units together successively along the polymer chain. The specific molecular weight range of polyimides produced by the disclosed method may vary. Generally, the noted reaction conditions may be varied to provide a polyimide with the desired physical properties without specific consideration of molecular weight. In some embodiments, a surrogate for molecular weight is provided in the viscosity of the solution of the amine salt of the polyamic acid, which is determined by variables such as temperature, concentrations, molar ratios of reactants, reaction time, and the like.

The molar ratio of the dianhydride to the diamine may vary according to desired reaction time, reagent structure, and desired material properties. In some embodiments, the molar ratio is from about 0.9 to about 3, such as from about 0.9, or about 1, to about 2, or about 3. In some embodiments, the ratio is about 1 (i.e., stoichiometric), such as from about 0.9 to about 1.1. In specific embodiments, the ratio is from about 0.99 to about 1.01.

The multifunctional amine (e.g., diamine) and the multifunctional anhydride (e.g., tetracarboxylic acid dianhydride) are allowed to react for a period of time in order to complete the reaction between the amino groups and the anhydride groups, providing the polyamic acid. The reaction is generally allowed to proceed until all of the available reactants (e.g., diamine and dianhydride) have reacted with one another. The time required for complete reaction may vary based on reagent structures, concentration, temperature. In some embodiments, the reaction time is from about 1 minute to about 1 week, for example, from about 15 minutes to about 5 days, from about 30 minutes to about 3 days, or from about 1 hour to about 1 day. In some embodiments, the reaction time is from about 0.5 hour to about 17 hours. In some embodiments, the reaction time is from about 1 hour to about 12 hours.

The temperature at which the reaction is conducted may vary. A suitable range of temperatures is generally between about 10° C. and about 100° C. In some embodiments, the reaction temperature is from about 10 to about 100° C., or from about 15 to about 60° C., or from about 15 to about 50° C., or from about 15 to about 25° C. In some embodiments, as the temperature is increased, polyimide gels may be produced with a wider pore size distribution and weaker structural properties. Without wishing to be bound by theory, it is believed that properties such as pore size distribution and structural rigidity may, in certain embodiments, vary with temperature, perhaps as a consequence of polyimide molecular weights, degree of chemical cross linking (when possible), and other factors which may exhibit a temperature dependence.

In some embodiments, the polyamic acid has a structure according to Formula III as illustrated in Scheme 1. The concentration of the polyamic acid in the solution may vary. For example, in some embodiments, the concentration of the polyamic acid (i.e., the density of the polyamic acid in solution) is from about 0.01 to about 0.3 g/cm$^3$. In some embodiments, the volume of solvent is chosen to provide a particular target density ($T_d$) of polyamic acid in the solution. Generally, a range of concentrations of polyamic acid present in solution is from about 0.01 to about 0.3 g/cm$^3$, based on the weight of the polyamic acid.

In an alternative embodiment, a preformed polyamic acid may be provided for use in the dehydration method. For example, a polyamic acid may be purchased, or may be prepared from reaction of multifunctional amines and multifunctional anhydrides in an organic solvent according to conventional synthetic methods in a separate step.

With reference to FIG. 1, after completion of the reaction forming the polyamic acid gel precursor (or following dissolution of a preformed polyamic acid in the solvent), a dehydrating agent is added, along with a monoamine and water, to initiate and drive imidization, thus forming the polyimide gel.

The structure of the dehydrating agent may vary, but is generally a reagent that is at least partially soluble in the reaction solution, reactive with the carboxylate groups of the ammonium salt, and effective in driving the imidization of the polyamic acid carboxyl and amide groups, while having minimal reactivity with the aqueous solution. One example of a class of suitable dehydrating agents is the carboxylic acid anhydrides, such as acetic anhydride, propionic anhydride, and the like. In some embodiments, the dehydrating agent is acetic anhydride. Surprisingly, according to the present disclosure, it has been found that addition of acetic anhydride to the aqueous solution of the ammonium salt resulted in rapid gelation of the polyimide without observing the intuitively expected substantial hydrolysis of the acetic anhydride with water. Any hydrolysis which did occur was not sufficient to compete with the function of the acetic anhydride in polyimide formation In some embodiments, the quantity of dehydrating agent may vary based on the quantity of multifunctional anhydride (e.g., tetracarboxylic dianhydride). For example, in some embodiments, the dehydrating agent is present in various molar ratios with the dianhydride. The molar ratio of the dehydrating agent to the dianhydride may vary according to desired reaction time, reagent structure, and desired material properties. In some embodiments, the molar ratio is from about 2 to about 10, such as from about 2, about 3, about 4, or about 5, to about 6, about 7, about 8, about 9, or about 10. In some embodiments, the ratio is from about 3 to about 6, or from about 4 to about 5. In some embodiments, the ratio is 4.3.

With reference to FIG. 1, a monoamine, or a combination of monoamines, is added to the solution. The term "monoamine" in the context of the present disclosure refers to a molecule having a single amino group available for accepting a proton. Suitable monoamines include tertiary alkyl amines, tertiary cycloalkyl amines, heteroaromatic amines, guanidines, and quaternary ammonium hydroxides.

In some embodiments, the monoamine is a tertiary alkyl or cycloalkyl amine. As used herein in the context of amines, "tertiary" means that the amine nitrogen atom has three organic (i.e., carbon) substituents attached thereto. In some embodiments, the tertiary amine is triethylamine, trimethylamine, tri-n-butylamine, N-methylpyrrolidine, N-methylpiperidine, or diisopropylethylamine.

In some embodiments, the monoamine is a heteroaromatic amine. The term "heteroaromatic amine" as used herein refer to an aromatic ring system in which one or more ring atoms is a nitrogen. A heteroaromatic amine generally comprises from 2 to 20 carbon atoms and 1 to 3 heteroatoms selected from N, O, P, and S, wherein at least one heteroatom is nitrogen. A heteroaromatic amine may be a monocycle having 3 to 7 ring members (2 to 6 carbon atoms and 1 to 3 heteroatoms selected) or a bicycle having 7 to 10 ring members (4 to 9 carbon atoms and 1 to 3 heteroatoms), for example, a bicyclo[4,5], [5,5], [5,6], or [6,6] system. A heteroaromatic amine can be unsubstituted or substituted. Particularly suitable are heteroaromatic amines having a monocyclic ring structure comprising 5 carbon atoms and one nitrogen atom, e.g., a pyridine. In some embodiments, the monoamine is pyridine. In some embodiments, the monoamine is pyridine bearing one or more alkyl substituents at suitable positions on the aromatic ring. For example, suitable pyridines include those substituted with one or more methyl groups, t-butyl groups, or combinations thereof. Non-limiting examples include 2-, 3-, and 4-picolines, 2,6-lutidine, 2,6-di-tert-butylpyridine, and the like. In some embodiments, the monoamine is pyridine.

In some embodiments, the monoamine is a guanidine, such as guanidine $((NH_2)_2C=NH)$ or an alkyl guanidine (e.g., of formula $(NR_1R_2)C=NR_3(NR_4R_5)$, wherein any one or more of $R_1$-$R_5$ are alkyl).

In some embodiments, the monoamine is a quaternary ammonium hydroxide. As used herein, the term "quaternary ammonium hydroxide" refers to an organic molecule containing a nitrogen atom which bears four substituents, and therefore has a positive (cationic) charge, balanced with hydroxide (OH$^-$) ions, and which dissociate in solution to the free quaternary ammonium cations and hydroxide anions. In some embodiments, the quaternary ammonium hydroxide is a tetraalkylammonium hydroxide. In some embodiments, the tetraalkylammonium hydroxide comprises from about 4 to about 16 carbon atoms, for example, from 4, 5, 6, 7, 8, 9, or 10 carbon atoms, to 11, 12, 13, 14, 15, or 16 carbon atoms. Non-limiting examples of suitable tetraalkylammonium hydroxides include, but are not limited to, tetramethylammonium hydroxide, tetraethylammonium hydroxide, and tetra-n-butylammonium hydroxide.

The quantity of the monoamine added may vary. In some embodiments, the amount of monoamine required to be added to achieve formation of the polyimide gel with a gelation time under about 3 minutes is reduced by up to about 27-fold relative to a method of forming a polyimide gel with density in the range of 0.05 g/cc, in the absence of water. In some embodiments, the amount of monoamine required to be added to achieve formation of the polyimide gel with a gelation time under about 15 seconds is reduced by up to about 50-fold relative to a method of forming a polyimide gel, with density in the range of 0.01 g/cc, in the absence of water. The quantity of monoamine added may be based on a molar ratio, for example, a molar ratio with respect to the polyamic acid. The molar ratio of the monoamine to the polyamic acid may vary according to desired reaction time, reagent structure, and desired material properties. In some embodiments, the molar ratio is from about 0.1 to about 8. In some embodiments, the molar ratio is from about 0.1, about 0.2, about 0.3, about 0.43, about 0.5, about 0.6, about 0.7, about 0.8, about 0.9, or about 1, to about 2, about 3, about 4, about 5, about 6, about 7, or about 8.

With reference to FIG. 1 and Scheme 1, water is added. As described herein above, the addition of water was surprisingly found to accelerate, rather than to retard, the dehydration of the polyamic acid. Without wishing to be bound by any particular theory, it is believed that the presence of a catalytic quantity of water may solvate ion-paired amine and carboxylate groups of the polyamic acid, promoting reaction with the dehydrating reagent. Notably, water alone, in the absence of monoamine, did not result in formation of the polyimide. Surprisingly, the presence of water as a co-catalyst greatly accelerated polyimide gel formation, reducing the time required for gelation from hours to minutes, seconds, or even instantaneously, depending on various factors as described below in the Examples.

The quantity of water added may vary. In some embodiments, the water is added in a molar ratio to the tetracarboxylic acid dianhydride. In some embodiments, a molar ratio of the water to the tetracarboxylic acid dianhydride is greater than about 5. In some embodiments, a molar ratio of the water to the tetracarboxylic acid dianhydride is from about 5 to about 500, such as from about 5, about 10, about 25, about 50, or about 100, to about 200, about 300, about 400, or about 500.

The temperature at which the dehydration reaction is allowed to proceed may vary, but is generally less than about 50° C., such as from about 10 to about 50° C., or from about 15 to about 25° C.

Gelation

The length of time from the addition of the monoamine and the water until gelation of the polyimide occurs may vary. Generally, gelation occurs in less than about 1 minute, or less than about 30 seconds, or less than about 15 seconds from addition of monoamine and water. In some embodiments, the polyimide gel has a structure according to Formula IV as illustrated in Scheme 1.

One of skill in the art will recognize that the polyimide wet-gels, whether prepared according to Method A or Method B as described herein above, will have unreacted terminal amino groups on one end or on both ends of the individual polymer chains. The percent concentration of such amino groups in the polymide wet-gel will vary in inverse proportion to the average number of repeat units (i.e., the molecular weight) present in the polyimide wet-gel. In some embodiments, the terminal amino groups may undergo reaction with the dehydrating agent to form, e.g., terminal acetamides. The relative concentration of such terminal amines or amides may be determined according to methods known in the art, including, but not limited to, nuclear magnetic resonance spectroscopy.

In some embodiments, the water content in the wet-gel, prior to any solvent exchange or drying, is essentially the entire quantity of water initially utilized as the reaction solvent, not accounting for any evaporation, or water produced or destroyed in the various reactions which occur during the polyimide synthesis as described herein above. Accordingly, in some embodiments, the water content in the wet-gel varies between about 75% and about 83% by volume for formulations having a target density ($T_d$) of about 0.07 to about 0.10 g/cm$^3$.

In some embodiments, the method further comprises casting the polyamic sol, prior to gelation, in a mold to form a polyimide wet-gel monolith. Generally, the wet-gel material is allowed to remain in a mold ("cast") for a period of time. The period of time may vary based on many factors, such as the desirability of aging the material.

The process of transitioning gel-forming components into a wet-gel material can also include an aging step (also referred to as curing) prior to liquid phase extraction. Aging a wet-gel material after it reaches its gel point can further strengthen the gel framework. For example, in some embodiments, the framework may be strengthened during aging. The duration of gel aging can be adjusted to control various properties within the corresponding aerogel material. This aging procedure can be useful in preventing potential volume loss and shrinkage during liquid phase extraction of the wet-gel material. Aging can involve: maintaining the gel (prior to extraction) at a quiescent state for an extended period; maintaining the gel at elevated temperatures; or any combination thereof. The preferred temperatures for aging are usually between about 10° C. and about 200° C. The aging of a wet-gel material typically continues up to the liquid phase extraction of the wet-gel material.

In some embodiments, the method comprises casting the gelling polyamic acid sol in a mold to form a polyimide wet-gel monolith. In some embodiments, the monolith has a thickness from about 5 to about 25 mm. In some embodiments, the monolith is in the form of a film, such as a film having a thickness from about 50 microns to about 1 mm.

Solvent Exchange

Following the molding and any aging, the resulting wet-gel material may be demolded and washed or solvent exchanged in a suitable secondary solvent to replace the primary reaction solvent (i.e., N,N-dimethylacetamide, N,N-dimethylformamide, or the like) present in the wet-gel. Such secondary solvents may be linear alcohols with 1 or more aliphatic carbon atoms, diols with 2 or more carbon atoms, or branched alcohols, cyclic alcohols, alicyclic alcohols, aromatic alcohols, polyols, ethers, ketones, cyclic ethers or their derivatives. In some embodiments, the secondary solvent is water, a C1 to C3 alcohol (e.g., methanol, ethanol, propanol, isopropanol), acetone, tetrahydrofuran, ethyl acetate, acetonitrile, supercritical fluid carbon dioxide ($CO_2$), or a combination thereof. In some embodiments, the secondary solvent is ethanol.

Bead Formation

For various applications, it may be desirable to provide the polyimide gel in beaded form. While the method as described herein above generally provide a polyimide gel in the form of a mold (e.g., a monolithic gel), the methods can be adapted for formation of beads. As used herein, the term "beads" is meant to include discrete small units or pieces having a generally spherical shape. In some embodiments, the gel beads are substantially spherical. The beads are generally uniform in composition, such that each bead in a plurality of beads comprises the same polyimide in approximately the same amounts within normal variations expected in preparing such beads. The size of the beads may vary according to the desired properties and method of preparing.

Figure 2:
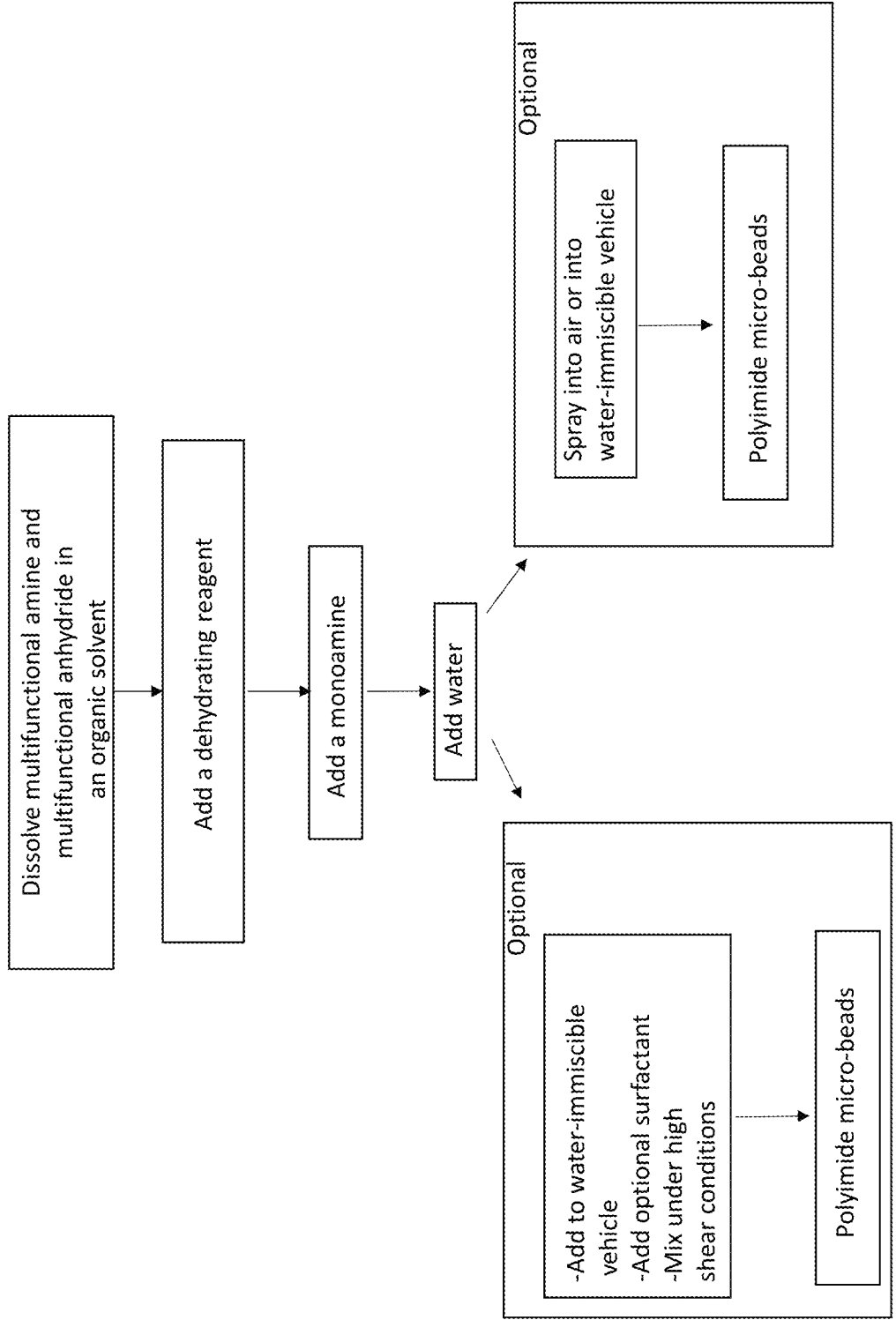
FIG. 2 is flow chart depicting another non-limiting embodiment of the disclosed method.

Accordingly, in some embodiments, the method further comprises casting polyimide beads in an emulsion. A non-limiting embodiment of the method is illustrated in FIG. 2. With reference to FIG. 2, the polyamic acid is formed and dehydrated as described herein above, and prior to gelation, which occurs rapidly, beads may be prepared by combining the sol with a water-immiscible vehicle, and optionally one or more surfactants, and mixing the biphasic mixture under high-shear conditions to provide micron-sized beads. In some embodiments, the water-immiscible vehicle and surfactant(s) are added to the sol. In some embodiments, the sol is added to the water-immiscible vehicle and surfactant(s).

The water-immiscible vehicle may vary. Suitable vehicles include, but are not limited to, oils such as silicone oil or mineral oil, aliphatic hydrocarbons, aromatic hydrocarbons, and chlorinated hydrocarbons. In some embodiments, the water-immiscible vehicle is a C5-C12 aliphatic or aromatic hydrocarbon. In some embodiments, the water-immiscible vehicle is hexane. In particular embodiments, the water-immiscible vehicle is mineral spirits.

The surfactant, when present, may vary. As used herein, the term "surfactant" refers to a substance which aids in the formation and stabilization of emulsions by promoting dispersion of hydrophobic and hydrophilic (e.g., oil and water) components.

Suitable surfactants are generally non-ionic, and include, but are not limited to, polyethylene glycol esters of fatty acids, propylene glycol esters of fatty acids, polysorbates, polyglycerol esters of fatty acids, sorbitan esters of fatty acid, and the like. Suitable surfactants have an HLB number ranging from about 0 to about 20. In some embodiments, the HLB number is from about 3.5 to about 6. As will be understood by one skilled in the art, HLB is the hydrophilic-lipophilic balance of an emulsifying agent or surfactant is a measure of the degree to which it is hydrophilic or lipophilic. The HLB value may be determined by calculating values for the different regions of the molecule, as described by Griffin in Griffin, William C. (1949), "Classification of Surface-Active Agents by 'HLB'" (PDF), Journal of the Society of Cosmetic Chemists, 1 (5): 311-26 and Griffin, William C. (1954), "Calculation of HLB Values of Non-Ionic Surfactants" (PDF), Journal of the Society of Cosmetic Chemists, 5 (4): 249-56, and by Davies in Davies JT (1957), "A quantitative kinetic theory of emulsion type, I. Physical chemistry of the emulsifying agent" (PDF), Gas/Liquid and Liquid/Liquid Interface, Proceedings of the International Congress of Surface Activity, pp. 426-38. HLB value may be determined in accordance with the industry standard text book, namely "The HLB SYSTEM, a time-saving guide to emulsifier selection" ICI Americas Inc., Published 1976 and Revised, March, 1980.

Examples of suitable surfactants generally include, but are not limited to: polyoxyethylene-sorbitan-fatty acid esters; e.g., mono- and tri-lauryl, palmityl, stearyl and oleyl esters; e.g., products of the type known as polysorbates and commercially available under the trade name Tween®; polyoxyethylene fatty acid esters, e.g., polyoxyethylene stearic acid esters of the type known and commercially available under the trade name Myrj®; polyoxyethylene ethers, such as those available under the trade name Brij®; polyoxyethylene castor oil derivatives, e.g., products of the type known and commercially available as Cremophors®, sorbitan fatty acid esters, such as the type known and commercially available under the name Span® (e.g., Span 80); polyoxyethylene-polyoxypropylene co-polymers, e.g., products of the type known and commercially available as Pluronic® or Poloxamer®; glycerol triacetate; and mono-glycerides and acetylated monoglycerides, e.g., glycerol monodicocoate (Imwitor® 928), glycerol monocaprylate (Imwitor® 308), and mono- and di-acetylated monoglycerides. In some embodiments, the one or surfactants comprise a commercially available polymeric surfactant of the type known under the trade name Hypermer® (Croda Industrial Chemicals; Edison, NJ, USA).

In some embodiments, the one or more surfactants comprise Tween 20, Tween 80, Span 20, Span 40, Span 60, Span 80, or a combination thereof. In some embodiments, the surfactant is Span 20, Tween 80, or a mixture thereof. In some embodiments, the one or more surfactants is Hypermer® B246SF. In some embodiments, the one or more surfactants is Hypermer® A70.

The concentration of the surfactant may vary. In some embodiments, the surfactant, or a mixture of surfactants, is present in the water-immiscible vehicle in amount by weight from about 1 to about 5%, such as about 1, about 2, about 3, about 4, or about 5%.

Spherical droplets of the aqueous sol form in the water-immiscible vehicle by virtue of the interface tension. The droplets gel and strengthen during the time in the water-immiscible vehicle, e.g., hexane. Agitation of the mixture is typically used to form an emulsion and/or to prevent the droplets from agglomerating. For example, the mixture of aqueous sol and water-immiscible vehicle can be agitated (e.g., stirred) to form an emulsion, which may be stable or temporary. Exemplary embodiments of agitation to provide gel beads from the sol mixture and water-immiscible vehicle include magnetic stirring (up to about 600 rpm), mechanical mixing (up to about 1500 rpm) and homogenization (i.e., high shear mixing at up to about 9000 rpm). In some embodiments, mixing is performed under high-shear conditions e.g., using a high-shear mixer or homogenizer). Fluid undergoes shear when one area of fluid travels at a different velocity relative to an adjacent area. A high-shear mixer (homogenizer) uses a rotating impeller or high-speed rotor, or a series of such impellers or inline rotors, to "work" the fluid, creating flow and shear. The tip velocity (i.e., the speed encountered by the fluid at the outside diameter of the rotor), will be higher than the velocity encountered at the center of the rotor, with this velocity difference creating shear. Generally, higher shear results in smaller beads. In some embodiments, a solvent, e.g., water or ethanol, can be added after gelation to produce smaller beads and reduce agglomeration of large clusters of beads.

The size of the wet-gel beads may vary. In some embodiments, the wet-gel beads have a size ranging from about 5 to about 500 microns in diameter, for example from about 5, about 10, about 20, about 30, about 40, or about 50, to about 60, about 70, about 80, about 90, about 100, about 200, about 300, about 400, or about 500 microns in diameter.

In some embodiments, the polyimide gel beads are cast as an aerosol. Accordingly, in some embodiments, the method further comprises spraying the polyamic sol solution, prior to gelation, into air or into a water-immiscible vehicle to form polyimide gel beads having a diameter from about 5 microns to about 250 microns. The method of spraying may include formation of droplets with gas assistance, or by electrospraying, and the like. In some embodiments, the solution is sprayed into air. In some embodiments, the solution is sprayed into a water-immiscible vehicle. The water-immiscible vehicle may vary. In some embodiments, the water-immiscible vehicle is an oil, such as mineral oil or silicone oil. In some embodiments, water-immiscible vehicle is a hydrocarbon, such as an aliphatic or aromatic hydrocarbon, which may be halogenated. In some embodiments, the water-immiscible vehicle is a C5-C12 hydrocarbon, for example, hexane. In particular embodiments, the water-immiscible vehicle is mineral spirits.

In some embodiments, the method is carried out as a continuous process as opposed to a batch process. In some embodiments, the continuous process comprises using spray equipment to spray and gel the polyimide sol instantly (e.g., in the form of spherical beads). The gel beads mat then be conveyed into an inert medium (e.g., air or a water-immiscible vehicle), in a continuous fashion, for the subsequent processing steps, such as filtration, aging/rinsing, drying, and carbonization.

Solvent Exchange

Following the bead formation by any of the foregoing methods, the resulting wet-gel beads may be washed or solvent exchanged in a suitable secondary solvent to replace the primary reaction solvent present in the wet-gel. Such secondary solvents may be linear alcohols with 1 or more aliphatic carbon atoms, diols with 2 or more carbon atoms, or branched alcohols, cyclic alcohols, alicyclic alcohols, aromatic alcohols, polyols, ethers, ketones, cyclic ethers or their derivatives. In some embodiments, the secondary solvent is water, a C1 to C3 alcohol (e.g., methanol, ethanol, propanol, isopropanol), acetone, tetrahydrofuran, ethyl acetate, acetonitrile, supercritical fluid carbon dioxide ($CO_2$), or a combination thereof. In some embodiments, the secondary solvent is ethanol.

Formation of Polyimide Xerogels and Aerogels

Once the wet-gel material (monoliths or beads) has been formed and processed, the liquid phase of the wet-gel material can then be extracted from the wet-gel material using extraction methods, including processing and extraction techniques, to form an aerogel material. Liquid phase extraction, among other factors, plays an important role in engineering the characteristics of aerogels, such as porosity and density, as well as related properties such as thermal conductivity. Generally, aerogels are obtained when a liquid phase is extracted from a wet-gel in a manner that causes low or no shrinkage to the porous network and framework of the wet-gel. Wet-gels can be dried using various techniques to provide aerogel or xerogel materials. In exemplary embodiments, wet-gel materials can be dried at ambient pressure, under vacuum (e.g., through freeze drying), at subcritical conditions, or at supercritical conditions to remove the solvent present in the wet-gel to form the corresponding dry gel (e.g., an aerogel or xerogel).

In some embodiment, it may be desirable to fine tune the surface area of the dry gel. If fine tuning of the surface area is desired, aerogels can be converted completely or partially to xerogels with various porosities. The high surface area of aerogels can be reduced by forcing some of the pores to collapse. This can be done, for example, by immersing the aerogels for a certain time in solvents such as ethanol or acetone or by exposing them to solvent vapor. The solvents are subsequently removed by drying at ambient pressure. Synthesis of non-porous shell/porous core beads may be performed by this approach, providing the solvents are prevented from completely filling the beads, such that the pore collapse occurs only at the surface of the beads.

Aerogels are commonly formed by removing the liquid phase from the pores of the wet-gel material at a temperature and pressure near or above the critical point of the liquid mobile phase. Once the critical point is reached (near critical) or surpassed (supercritical; i.e., pressure and temperature of the system is at or higher than the critical pressure and critical temperature, respectively) a new supercritical phase appears in the fluid that is distinct from the liquid or vapor phase. The solvent can then be removed without introducing a liquid-vapor interface, capillary forces, or any associated mass transfer limitations typically associated with receding liquid-vapor boundaries. Additionally, the supercritical phase is more miscible with organic solvents in general, thus having the capacity for better extraction. Co-solvents and solvent exchanges are also commonly used to optimize the supercritical fluid drying process.

If evaporation or extraction occurs below the supercritical point, capillary forces generated by liquid evaporation can cause shrinkage and pore collapse within the gel material.

Maintaining the liquid phase near or above the critical pressure and temperature during the solvent extraction process reduces the negative effects of such capillary forces. In certain embodiments of the present disclosure, the use of conditions just below the critical point of the solvent system may allow production of aerogel or aerogel-like materials or compositions with low shrinkage.

Wet-gels can be dried using various techniques to provide xerogel or aerogel materials. In example embodiments, wet-gel materials can be dried at ambient pressure, at subcritical conditions, or at supercritical conditions.

Both room temperature and/or high temperature processes can be used to dry gel materials at ambient pressure. In some embodiments, a slow ambient pressure drying process can be used in which the wet-gel is exposed to air in an open container for a period of time sufficient to remove solvent, e.g., for a period of time in the range of hours to weeks, depending on the solvent, the quantity of wet-gel, the exposed surface area, the size of the wet-gel, and the like.

In another embodiment, the wet-gel material is dried by heating. For example, the wet-gel material can be heated in a convection oven for a period of time to evaporate most of the solvent (e.g., ethanol). After partially drying, the gel can be left at ambient temperature to dry completely for a period of time, e.g., from hours to days. Generally, xerogels are obtained by this process.

In some embodiments, the wet-gel material is dried by freeze drying. By "freeze drying" or "lyophilizing" is meant a low temperature process for removal of solvent that involves freezing a material (e.g., the wet-gel material), lowering the pressure, and then removing the frozen solvent by sublimation. As water represents an ideal solvent for removal by freeze drying, and water is the solvent in the method as disclosed herein, freeze drying is particularly suited for aerogel formation from the disclosed polyimide wet-gel materials.

Both supercritical and sub-critical drying can be used to dry wet-gel materials. In some embodiments, the wet-gel material is dried under subcritical or supercritical conditions. In an example embodiment of supercritical drying, the gel material can be placed into a high-pressure vessel for extraction of solvent with supercritical $CO_2$. After removal of the solvent, e.g., ethanol, the vessel can be held above the critical point of $CO_2$ for a period of time, e.g., about 30 minutes. Following supercritical drying, the vessel is depressurized to atmospheric pressure. Generally, aerogels are obtained by this process.

In an example embodiment of subcritical drying, the gel material is dried using liquid $CO_2$ at a pressure in the range of about 800 psi to about 1200 psi at room temperature. This operation is quicker than supercritical drying; for example, the solvent (e.g., ethanol) can be extracted in about 15 minutes. Generally, aerogels are obtained by this process.

Several additional aerogel extraction techniques are known in the art, including a range of different approaches in the use of supercritical fluids in drying aerogels, as well as ambient drying techniques. For example, Kistler (J. Phys. Chem. (1932) 36: 52-64) describes a simple supercritical extraction process where the gel solvent is maintained above its critical pressure and temperature, thereby reducing evaporative capillary forces and maintaining the structural integrity of the gel network. U.S. Pat. No. 4,610,863 describes an extraction process where the gel solvent is exchanged with liquid carbon dioxide and subsequently extracted at conditions where carbon dioxide is in a supercritical state. U.S. Pat. No. 6,670,402 teaches extracting a liquid phase from a gel via rapid solvent exchange by injecting supercritical (rather than liquid) carbon dioxide into an extractor that has been pre-heated and pre-pressurized to substantially supercritical conditions or above, thereby producing aerogels. U.S. Pat. No. 5,962,539 describes a process for obtaining an aerogel from a polymeric material that is in the form of a sol-gel in an organic solvent, by exchanging the organic solvent for a fluid having a critical temperature below a temperature of polymer decomposition, and supercritically extracting the fluid from the sol-gel. U.S. Pat. No. 6,315,971 discloses a process for producing gel compositions comprising: drying a wet gel comprising gel solids and a drying agent to remove the drying agent under drying conditions sufficient to reduce shrinkage of the gel during drying. U.S. Pat. No. 5,420,168 describes a process whereby resorcinol/formaldehyde aerogels can be manufactured using a simple air-drying procedure. U.S. Pat. No. 5,565,142 describes drying techniques in which the gel surface is modified to be stronger and more hydrophobic, such that the gel framework and pores can resist collapse during ambient drying or subcritical extraction. Other examples of extracting a liquid phase from aerogel materials can be found in U.S. Pat. Nos. 5,275,796 and 5,395,805.

In some embodiments, extracting the liquid phase from the wet-gel uses supercritical conditions of carbon dioxide, including, for example: first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than the critical pressure of carbon dioxide (about 1070 psig). The pressure around the gel material can be slightly fluctuated to facilitate removal of the supercritical carbon dioxide fluid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber. In other embodiments, extraction can be performed using any suitable mechanism, for example altering the pressures, timings, and solvent discussed above.

Formation of Carbon Aerogels and Xerogels

In some embodiments, the dried polyimide xerogel or aerogel (monolithic or beads) as disclosed herein is carbonized, meaning the polyimide xero- or aerogel is heated at a temperature and for a time sufficient to convert substantially all of the organic material into carbon. The time and temperature required may vary. In some embodiments, the dried polyimide aerogel is subjected to a treatment temperature of 400° C. or above, 600° C. or above, 800° C. or above, 1000° C. or above, 1200° C. or above, 1400° C. or above, 1600° C. or above, 1800° C. or above, 2000° C. or above, 2200° C. or above, 2400° C. or above, 2600° C. or above, 2800° C. or above, or in a range between any two of these values, for carbonization of the polyimide aerogel. Generally, the pyrolysis is conducted under an inert atmosphere to prevent combustion of the organic or carbon material. Suitable atmospheres include, but are not limited to, nitrogen, argon, or combinations thereof. In some embodiments, pyrolysis is performed under nitrogen.

Formation of Silicon-Doped Gels

In some embodiments, any of the wet-gels as disclosed herein may be doped with silicon, for example, silicon particles, to provide silicon-doped polyimide or carbon gels (wet-gels, xerogels or aerogels, monoliths or beads). Within the context of the present disclosure, the term "silicon particles" refers to silicon or silicon-based materials with a range of particle sizes suitable for use with polyimide or carbon gels as disclosed herein. Silicon particles of the present disclosure can be nanoparticles, e.g., particles with two or three dimensions in the range of about 1 nm to about 150 nm. Silicon particles of the present disclosure can be fine particles, e.g., micron-sized particles with a maximum dimension, e.g., a diameter for a substantially spherical particle, in the range of about 150 nm to about 10 micrometers or larger. For example, silicon particles of the present disclosure can have a maximum dimension, e.g., a diameter for a substantially spherical particle, of about 10 nm, 50 nm, 100 nm, 150 nm, 200 nm, 500 nm, 1 micrometer, 1.5 micrometers, 2 micrometers, 3 micrometers, 5 micrometers, 10 micrometers, 20 micrometers, 40 micrometers, 50 micrometers, 100 micrometers, or in a range between any two of these values. In some embodiments, the particles are flat fragmented shapes, e.g., platelets, having two dimensions, e.g., a length and a width, of about 10 nm, 50 nm, 100 nm, 150 nm, 200 nm, 500 nm, 1 micrometer, 1.5 micrometers, 2 micrometers, 3 micrometers, 5 micrometers, 10 micrometers, 20 micrometers, 40 micrometers, 50 micrometers, 100 micrometers, or in a range between any two of these values. In some embodiments, the silicon particles can be monodispersed or substantially monodispersed. In other embodiments, the silicon particles can have a particle size distribution. Within the context of the present disclosure, the dimensions of silicon particles are provided based upon the median of the particle size distribution, i.e., the D50. Silicon particles of the present disclosure can be silicon wires, crystalline silicon, amorphous silicon, silicon alloys, silicon oxides ($SiO_x$), coated silicon, e.g., carbon coated silicon, and any combinations of silicon particle materials disclosed herein. In some embodiments, silicon particles can be substantially planar flakes, i.e., having a flat fragmented shape, which can also be referred to as a platelet shape. For example, the particles have two substantially flat major surfaces connected by a minor surface defining the thickness between the major surfaces. In other embodiments, particles of silicon or other electroactive materials can be substantially spherical, cubic, obloid, elliptical, disk-shaped, or toroidal.

Silicon particles can be produced by various techniques, including electrochemical reduction and mechanical milling, i.e., grinding. Grinding can be conducted using wet or dry processes. In dry grinding processes, powder is added to a vessel, together with grinding media. The grinding media typically includes balls or rods of zirconium oxide (yttrium stabilized), silicon carbide, silicon oxide, quartz, or stainless steel. The particle size distribution of the resulting ground material is controlled by the energy applied to the system and by matching the starting material particle size to the grinding media size. However, dry grinding is an inefficient and energy consuming process. Wet grinding is similar to dry grinding with the addition of a grinding liquid. An advantage of wet grinding is that the energy consumption for producing the same result is 15-50% lower than for dry grinding. A further advantage of wet grinding is that the grinding liquid can protect the grinding material from oxidizing. It has also been found that wet grinding can produce finer particles and result in less particle agglomeration.

Wet grinding can be performed using a wide variety of liquid components. In an exemplary embodiment, the grinding liquid or components included in the grinding liquid are selected to reduce or eliminate chemical functionalization on the surface of the silicon particles during or after grinding. In other embodiments, the grinding liquid or components included in the grinding liquid are selected to provide a desired surface chemical functionalization of the particles, e.g., the silicon particles, during or after grinding. The grinding liquid or components included in the grinding liquid can also be selected to control the chemical reactivity or crystalline morphology of the particles, e.g., the silicon particles. In exemplary embodiments, the grinding liquid or components included in the grinding liquid can be selected based on compatibility or reactivity with downstream materials, processing steps or uses for the particles, e.g., the silicon particles. For example, the grinding liquid or components included in the grinding liquid can be compatible with, useful in, or identical to the liquid or solvent used in a process for forming or manufacturing organic or inorganic aerogel materials. In yet another embodiment, the grinding liquid can be selected such that the grinding liquid or components included in the grinding liquid produce a coating on the silicon particle surface or an intermediary species, such as an aliphatic or aromatic hydrocarbon, or by cross-linking or producing cross-functional compounds, that react with the organic or inorganic aerogel material.

The solvent or mixture of solvents used for grinding can be selected to control the chemical functionalization of the particles during or after grinding. Using silicon as an example, and without being bound by theory, grinding silicon in alcohol-based solvents, such as isopropanol, can functionalize the surface of the silicon and covalently bond alkyl surface groups, e.g., isopropyl, onto the surface of the silicon particles. With air exposure, the alkyl groups can transform to corresponding alkoxides through oxidation as evidenced by FTIR-ATR analysis. In exemplary embodiments, grinding can be carried out in polar aprotic solvents such as DMSO, DMF, NMP, DMAC, THF, 1,4-dioxane, diglyme, acetonitrile, water or any combination thereof.

The silicon particles may be incorporated into the polyimide or carbon gels as disclosed herein in a number of ways. Generally, silicon particles are incorporated during the sol-gel process. In one non-limiting embodiment, silicon particles are dispersed in the polyamic acid sol prior to imidization. In some embodiments, silicon particles are dispersed in a solvent, e.g., water, or a polar, aprotic solvent, before combination with the polyimide precursors. In some embodiments, silicon particles are dispersed in the polyamic acid sol during the imidization process.

Properties of the Polyimide and Carbon Aerogels

In some embodiments, the polyimide and carbon aerogel as disclosed herein can take the form of a monolith. As used herein, the term "monolith" refers to aerogel materials in which a majority (by weight) of the aerogel included in the aerogel material is in the form of a macroscopic, unitary, continuous, self-supporting object. Monolithic aerogel materials include aerogel materials which are initially formed to have a well-defined shape, but which can be subsequently cracked, fractured or segmented into non-self-repeating objects. For example, irregular chunks may be considered as monoliths. Monolithic aerogels may take the form of a freestanding structure, or a reinforced material with fibers or an interpenetrating foam.

In other embodiments, the aerogel of the disclosure, e.g., polyimide or carbon aerogel, may be in particulate form, for example as beads or particles from, e.g., crushing monolithic material. The aerogel in particulate form can have various particle sizes. In the case of spherical particles (e.g., beads), the particle size is the diameter of the particle. In the case of irregular particles, the term particle size refers to the maximum dimension (e.g., a length, width, or height). The particle size may vary depending on the physical form, preparation method, and any subsequent physical steps performed. In some embodiments, the aerogel in particulate form can have a particle size from about 1 micrometer to about 10 millimeters. For example, the aerogel in particulate form can have a particle size of about 1 micrometer, about 2 micrometers, about 3 micrometers, about 4 micrometers, about 5 micrometers, about 6 micrometers, about 7 micrometers, about 8 micrometers, about 9 micrometers, about 10 micrometers, about 15 micrometers, about 20 micrometers, about 25 micrometers, about 30 micrometers, about 35 micrometers, about 40 micrometers, about 45 micrometers, about 50 micrometers, about 60 micrometers, about 70 micrometers, about 80 micrometers, about 90 micrometers, about 100 micrometers, about 200 micrometers, about 300 micrometers, about 400 micrometers, about 500 micrometers, about 600 micrometers, about 700 micrometers, about 800 micrometers, about 900 micrometers, about 1 millimeter, about 2 millimeters, about 3 millimeters, about 4 millimeters, about 5 millimeters, about 6 millimeters, about 7 millimeters, about 8 millimeters, about 9 millimeters, about 10 millimeters, or in a range between any two of these values. In some embodiments, the aerogel can have a particle size in the range of about 5 micrometers to about 100 micrometers, or from about 5 to about 50 micrometers. In some embodiments, the aerogel can have a particle size in the range of about 1 to about 4 millimeters.

Polyimide and carbon aerogels as disclosed herein have a density. As used herein, the term "density" refers to a measurement of the mass per unit volume of an aerogel material or composition. The term "density" generally refers to the true or skeletal density of an aerogel material, as well as the bulk density of an aerogel composition. Density is typically reported as $kg/m^3$ or $g/cm^3$. The skeletal density of a polyimide or carbon aerogel may be determined by methods known in the art, including, but not limited to helium pycnometry. The bulk density of a polyimide or carbon aerogel may be determined by methods known in the art, including, but not limited to: Standard Test Method for Dimensions and Density of Preformed Block and Board-Type Thermal Insulation (ASTM C303, ASTM International, West Conshohocken, Pa.); Standard Test Methods for Thickness and Density of Blanket or Batt Thermal Insulations (ASTM C167, ASTM International, West Conshohocken, Pa.); or Determination of the apparent density of preformed pipe insulation (ISO 18098, International Organization for Standardization, Switzerland). Within the context of the present disclosure, density measurements are acquired according to ASTM C167 standards by nitrogen adsorption measurements at 77° K unless otherwise stated. In some embodiments, the polyimide or carbon aerogels as disclosed herein have a bulk density from about 0.01 to about 0.1 $g/cm^3$.

Polyimide and carbon aerogels as disclosed herein have a pore size distribution. As used herein, the term "pore size distribution" refers to the statistical distribution or relative amount of each pore size within a sample volume of a porous material. A narrower pore size distribution refers to a relatively large proportion of pores at a narrow range of pore sizes. In some embodiments, a narrow pore size distribution may be desirable in e.g., optimizing the amount of pores that can surround an electrochemically active species and maximizing use of the available pore volume. Conversely, a broader pore size distribution refers to relatively small proportion of pores at a narrow range of pore sizes. As such, pore size distribution is typically measured as a function of pore volume and recorded as a unit size of a full width at half max of a predominant peak in a pore size distribution chart. The pore size distribution of a porous material may be determined by methods known in the art, for example including, but not limited to, surface area, skeletal density, and porosimetry, from which pore size distribution can be calculated. Suitable methods for determination of such features include, but are not limited to, measurements of gas adsorption/desorption (e.g., nitrogen), helium pycnometry, mercury porosimetry, and the like. Measurements of pore size distribution reported herein are acquired by nitrogen sorption analysis unless otherwise stated. In certain embodiments, polyimide or carbon aerogels of the present disclosure have a relatively narrow pore size distribution.

Polyimide and carbon aerogels as disclosed herein have a pore volume. As used herein, the term "pore volume" refers to the total volume of pores within a sample of porous material. Pore volume is specifically measured as the volume of void space within the porous material, and is typically recorded as cubic centimeters per gram ($cm^3/g$ or cc/g). The pore volume of a porous material may be determined by methods known in the art, for example including, but not limited to, surface area and porosity analysis (e.g. nitrogen porosimetry, mercury porosimetry, helium pycnometry, and the like). In certain embodiments, polyimide or carbon aerogels of the present disclosure have a relatively large pore volume of about 1 cc/g or more, 1.5 cc/g or more, 2 cc/g or more, 2.5 cc/g or more, 3 cc/g or more, 3.5 cc/g or more, 4 cc/g or more, or in a range between any two of these values. In other embodiments, polyimide or carbon aerogels and xerogels of the present disclosure have a pore volume of about 0.03 cc/g or more, 0.1 cc/g or more, 0.3 cc/g or more, 0.6 cc/g or more, 0.9 cc/g or more, 1.2 cc/g or more, 1.5 cc/g or more, 1.8 cc/g or more, 2.1 cc/g or more, 2.4 cc/g or more, 2.7 cc/g or more, 3.0 cc/g or more, 3.3 cc/g or more, 3.6 cc/g or more, or in a range between any two of these values.

In some embodiments of the disclosure, the gel materials (polyimide or carbon, aerogel or xerogel, monolith or bead) may comprise a fibrillar morphology. Within the context of the present disclosure, the term "fibrillar morphology" refers to the structural morphology of a nanoporous material (e.g., a carbon aerogel) being inclusive of struts, rods, fibers, or filaments All methods described herein can be performed in any suitable order unless otherwise indicated herein or otherwise clearly contradicted by context. The use of any and all examples, or exemplary language (e.g., "such as") provided herein, is intended merely to better illustrate the materials and methods and does not pose a limitation on the scope unless otherwise claimed. No language in the specification should be construed as indicating any non-claimed element as essential to the practice of the disclosed materials and methods.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein.

Although the technology herein has been described with reference to particular embodiments, it is to be understood that these embodiments are merely illustrative of the principles and applications of the present technology. It will be apparent to those skilled in the art that various modifications and variations can be made to the method and apparatus of the present technology without departing from the spirit and scope of the technology. Thus, it is intended that the present technology include modifications and variations that are within the scope of the appended claims and their equivalents.

Reference throughout this specification to "one embodiment," "certain embodiments," "one or more embodiments" or "an embodiment" means that a particular feature, structure, material, or characteristic described in connection with the embodiment is included in at least one embodiment of the technology. Thus, the appearances of phrases such as "in one or more embodiments," "in certain embodiments," "in one embodiment" or "in an embodiment" in various places throughout this specification are not necessarily referring to the same embodiment of the technology. Furthermore, the particular features, structures, materials, or characteristics may be combined in any suitable manner in one or more embodiments. Any ranges cited herein are inclusive.

Aspects of the present technology are more fully illustrated with reference to the following examples. Before describing several exemplary embodiments of the technology, it is to be understood that the technology is not limited to the details of construction or process steps set forth in the following description. The technology is capable of other embodiments and of being practiced or being carried out in various ways. The following examples are set forth to illustrate certain aspects of the present technology and are not to be construed as limiting thereof.

EXAMPLES

The present invention may be further illustrated by the following non-limiting examples describing the methods and materials.

Example 1. Preparation of PMDA-PDA Polyimide Gel without Water Addition, Fixed Pyridine Concentration (Reference)

Polyimide gels were prepared at a target density of 0.05 g/cm$^3$. Solid pyromellitic dianhydride (PMDA, 3.38 g, 0.0155 mol) was dissolved in 77 g of dimethylacetamide (DMAc). After 30 min of stirring, 1,4-phenylene diamine (PDA, 1.67 g, 1:1 mol/mol ratio to PMDA) was added to the PMDA solution. The mixture was stirred for 4 hours at room temperature. To the resulting polyamic acid solution, acetic anhydride (6.8 g, 4.3 mol/mol ratio relative to PMDA) was added, and the mixture was stirred for another 20 minutes. At the end of that period, pyridine (1.23 g, 1.0 mol/mol ratio relative to PMDA) was added to the solution. After addition of the pyridine, the resulting sol was stirred for 2 min, and then poured into molds for gelation. Gelation took place at room temperature in about 90 min.

Example 2. Preparation of PMDA-PDA Polyimide Gel without Water Addition, Varied Pyridine Concentrations (Reference)

A polyimide gels were prepared as in Example 1, but using molar ratios of pyridine relative to PMDA of 2 and 4 (Examples 2.1 and 2.2, respectively). The gelation of the two sols happened at 38 min and 26 min, respectively.

Example 3. Preparation of PMDA-PDA Polyimide Gel with Water Addition, Fixed Pyridine Concentration Polyimide gels were prepared at a target density of 0.05 g/cm$^3$. PMDA (3.38 g, 0.0155 mol) was dissolved in 68 g of DMAc. After 30 min of stirring, PDA (1.67 g, 1:1 mol/mol ratio relative to PMDA) was added to the PMDA solution. The mixture was stirred for 4 h at room temperature. To the resulting polyamic acid solution, acetic anhydride (6.8 g, 4.3 mol/mol ratio relative to PMDA) was added, and the mixture was stirred for 20 minutes. At the end of that period, pyridine (1.23 g, 1.0 mol/mol ratio relative to PMDA) was added to that solution. The resulting sol was stirred for 2 min, and 9.8 g of water (35 mol/mol ratio relative to PMDA) was added. Gelation took place at room temperature in about 3.5 min (versus 90 minutes in the absence of water; see Example 1).

Example 4. Preparation of PMDA-PDA Polyimide Gel with Varied Water and Pyridine Concentration, at Fixed Target Density (0.05 g/cc)

A study was performed to evaluate the effect of the $H_2O$/PMDA molar ratio at five different pyridine/PMDA molar ratios (0.25, 0.45, 1, 2, and 4) on gelation time of PMDA-PDA polyimides at 0.05 g/cm$^3$ gel density in DMAc using acetic anhydride as the dehydrating agent. The $H_2O$/PMDA molar ratio was varied from 10 to 35 (0, 10, 15, 20, 25, 30, and 35) (see Table 2 below). Several representative procedures for the polyimide gel preparations are provided below as Examples 4.1, 4.2, and 4.3.

TABLE 2

Reagent molar ratios.

| Factors | Molar ratios | Effects Evaluated |
| --- | --- | --- |
| Py/PMDA (mol/mol) | 0.25, 0.45, 0.65, 1, 2, 4 | geltime ($T_g$), surface area |
| $H_2O$/PMDA (mol/mol) | 10, 15, 20, 25, 30, 35 | (BET), pore volume |

Example 4.1: Polyimide Gel Synthesis with Pyridine/PMDA=0.45 and $H_2O$/PMDA=20

Solid PMDA (3.38 g, 0.0155 mol) was dissolved in 72 g of DMAc. After 30 min of stirring, PDA (1.67 g, 1:1 mol/mol ratio relative to PMDA) was added to the PMDA solution. The mixture was stirred for 4 h at room temperature. To the resulting polyamic acid solution, acetic anhydride (6.8 g, 4.3 mol/mol ratio relative to PMDA) was added, and the mixture was stirred for 20 minutes. At the end of the reaction period, pyridine (0.55 g, 0.45 mol/mol ratio relative to PMDA) was added to the solution. The resulting sol was stirred for 2 min, and 5.58 g of water (20 mol/mol ratio relative to PMDA) was added to the sol. Gelation took place at room temperature in about 11 min.

Example 4.2: Polyimide Gel Synthesis with Pyridine/PMDA=0.25 and $H_2O$/PMDA=10

Solid PMDA (3.38 g, 0.0155 mol) was dissolved in 75 g of DMAc. After 30 min of stirring, PDA (1.67 g, 1:1 mol/mol ratio relative to PMDA) was added to the PMDA solution. The mixture was stirred for 4 h at room temperature. To the resulting polyamic acid solution, acetic anhydride (6.8 g, 4.3 mol/mol ratio relative to PMDA) was added, and the mixture was stirred for 20 minutes. At the end of the reaction period, pyridine (0.30 g, 0.25 mol/mol ratio relative to PMDA) was added to the solution. The resulting sol was stirred for 2 min, and 2.79 g of water (10 mol/mol ratio relative to PMDA) was added to the sol. Gelation took place at room temperature in about 97 min.

Example 4.3: Polyimide Gel Synthesis with Pyridine/PMDA=2 and $H_2O$/PMDA=15

Solid PMDA (3.38 g, 0.0155 mol) was dissolved in 72 g of DMAc. After 30 min of stirring, PDA (1.67 g, 1:1 mol/mol ratio relative to PMDA) was added to the PMDA solution. The mixture was stirred for 4 h at room temperature. To the resulting polyamic acid solution, acetic anhydride (6.8 g, 4.3 mol/mol ratio relative to PMDA) was added, and the mixture was stirred for 20 minutes. At the end of the reaction period, pyridine (2.45 g, 2.0 mol/mol ratio relative to PMDA) was added to the solution. The resulting sol was stirred for 2 min, and 4.18 g of water (15 mol/mol ratio relative to PMDA) was added to the sol. Gelation took place at room temperature in about 8.2 min.

Results: Examples 1-4

Figure 3A:
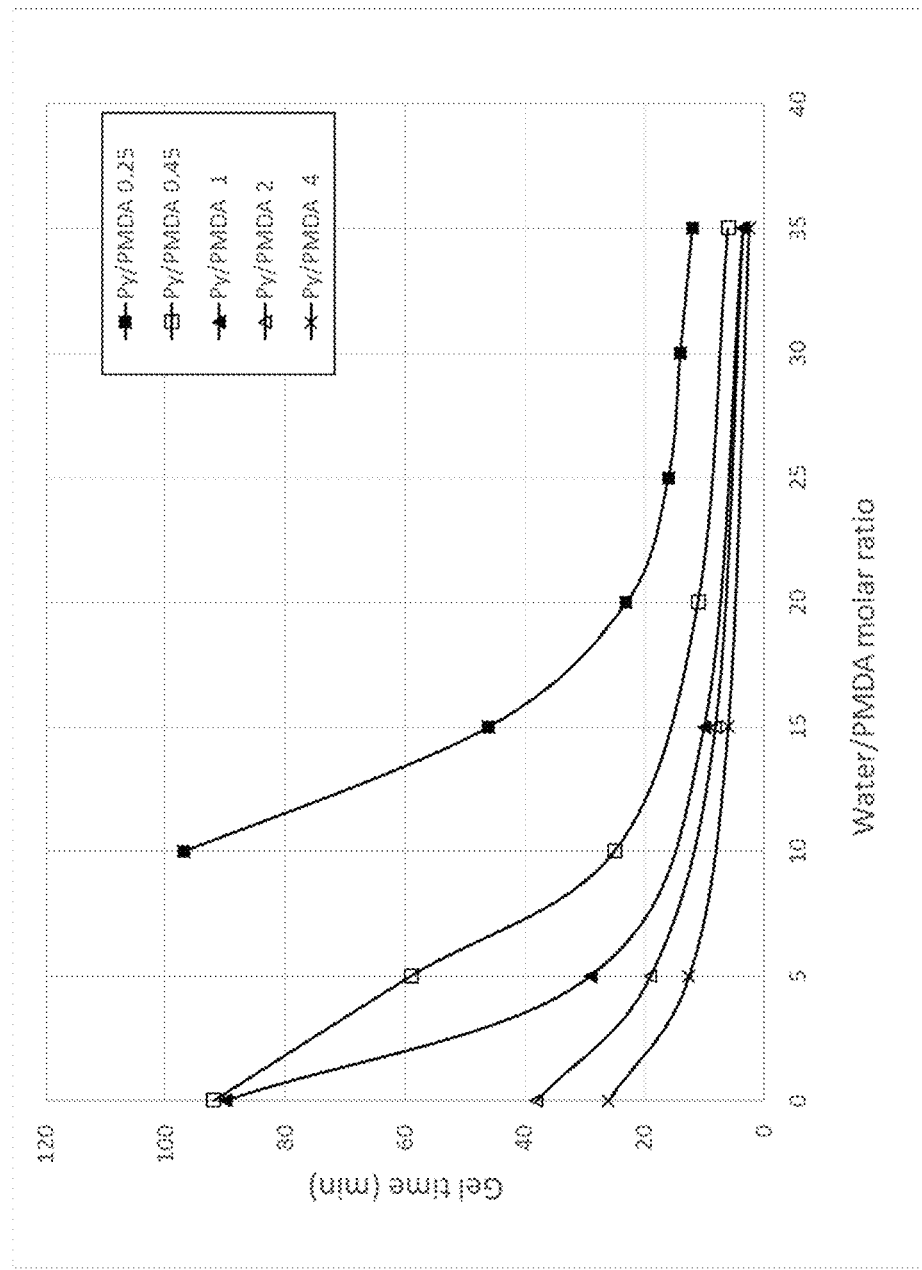
FIG. 3A is a plot of gel time versus the molar ratio of water to tetracarboxylic acid dianhydride molar ratio for non-limiting embodiments of the disclosure.
Figure 3B:
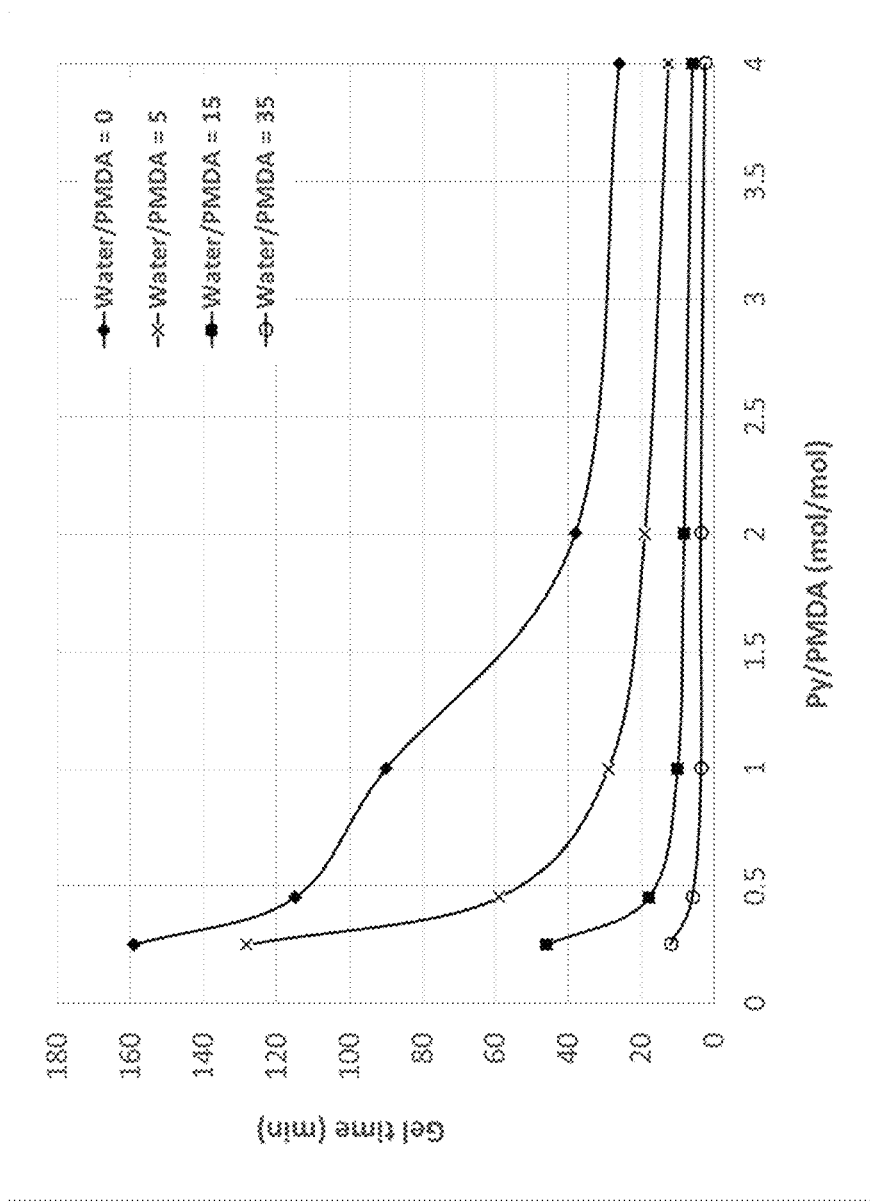
FIG. 3B is a plot of gel time versus the molar ratio of pyridine to tetracarboxylic acid dianhydride for non-limiting embodiments of the disclosure.

The data shown in FIGS. 3A and 3B demonstrate that the gel time rapidly decreased as the amount of water was increased, and at the highest $H_2O$/PMDA molar ratio of 35, all the curves converged, meaning that the effect of the pyridine/PMDA molar ratio became practically insignificant.

To evaluate the properties of the corresponding carbon aerogels, polyimide aerogels were prepared from each wet gel in Example 4. The polyimide wet gels were washed with ethanol and dried by supercritical $CO_2$ extraction to provide the corresponding polyimide aerogels. The polyimide aerogels were carbonized under nitrogen to provide the corresponding carbon aerogels.

Figure 6:
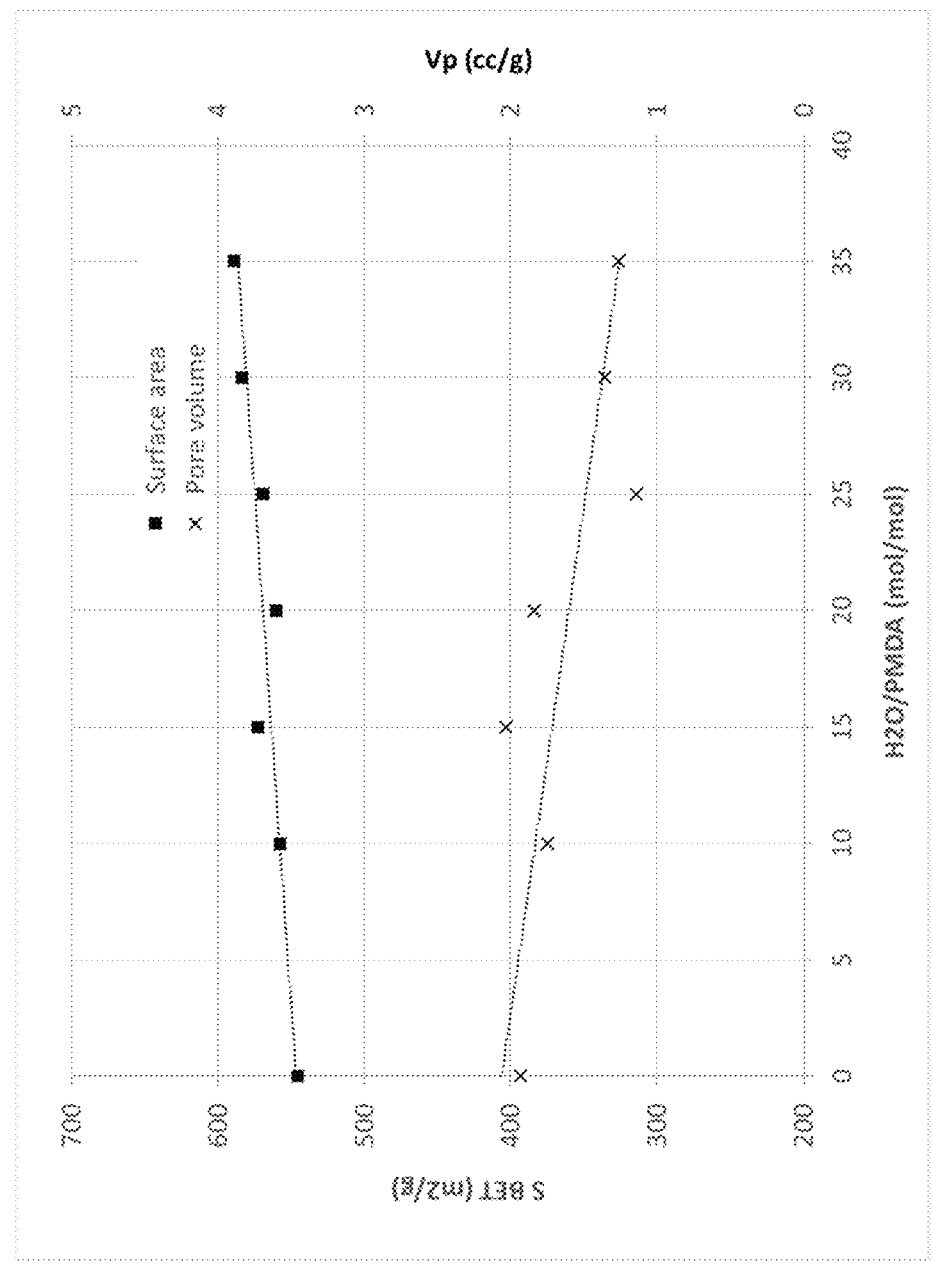
FIG. 6 is a plot of surface area and pore volume versus the molar ratio of water to tetracarboxylic acid dianhydride molar ratio for non-limiting embodiments of the disclosure.

The physical and structural properties of polyimide (PI) and corresponding carbon aerogels are provided in FIG. 4 (PY/PMDA=0.25) and FIG. 5 (PY/PMDA=0.45). The surface area and pore volume of the carbon aerogels were evaluated as a function of water to PMDA molar ratio. Results provided in FIG. 6 correspond to carbon aerogels resulting from polyimide aerogels made with fixed pyridine/PMDA=0.65, fixed target density of 0.05 g/cc, and at different $H_2O$/PMDA molar ration. Results shown in FIG. 6 demonstrated a slight effect of $H_2O$/PMDA molar ratio on surface area (increasing from about 550 to about 600 $m^2$/g over $H_2O$/PMDA molar ratios of 0 to 35), while pore volume decreased with increasing $H_2O$/PMDA molar ratio.

Figure 7B:
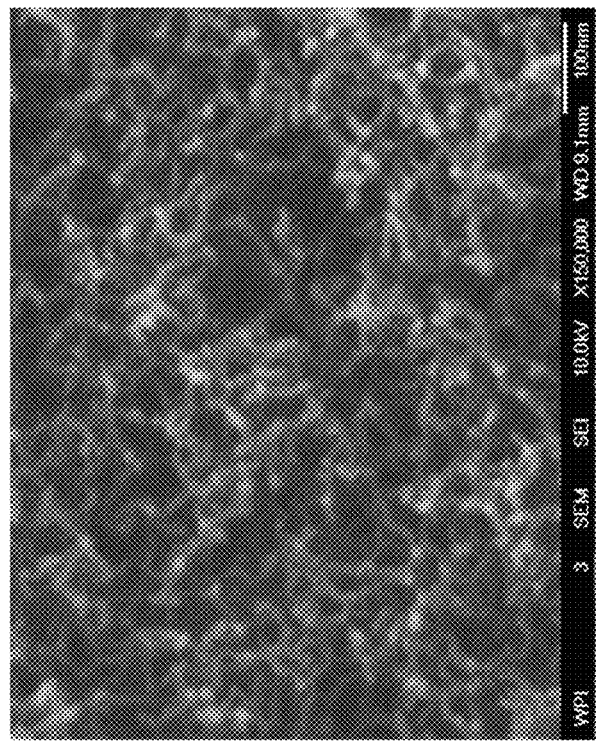
FIG. 7B is a scanning electron photomicrograph of a carbon aerogel according to a non-limiting embodiment of the disclosure.
Figure 7A:
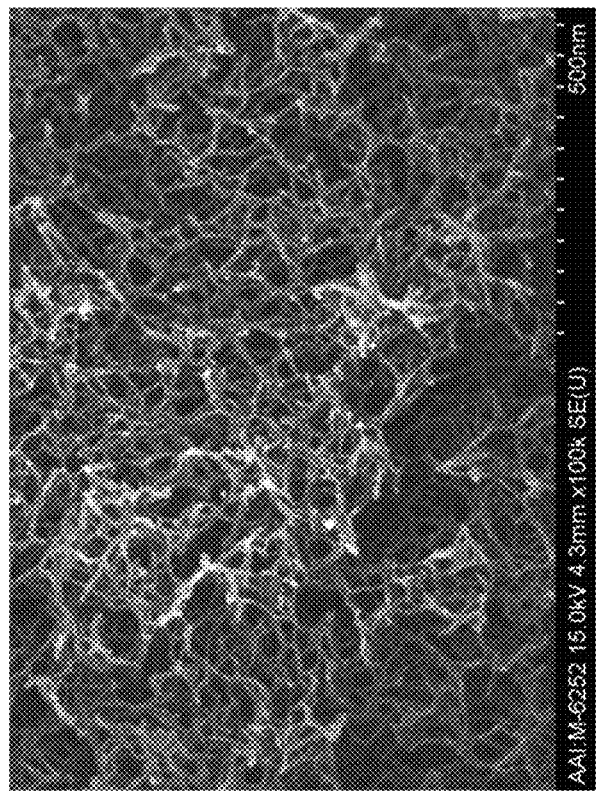
FIG. 7A is a scanning electron photomicrograph of a reference carbon aerogel.
Figure 8B:
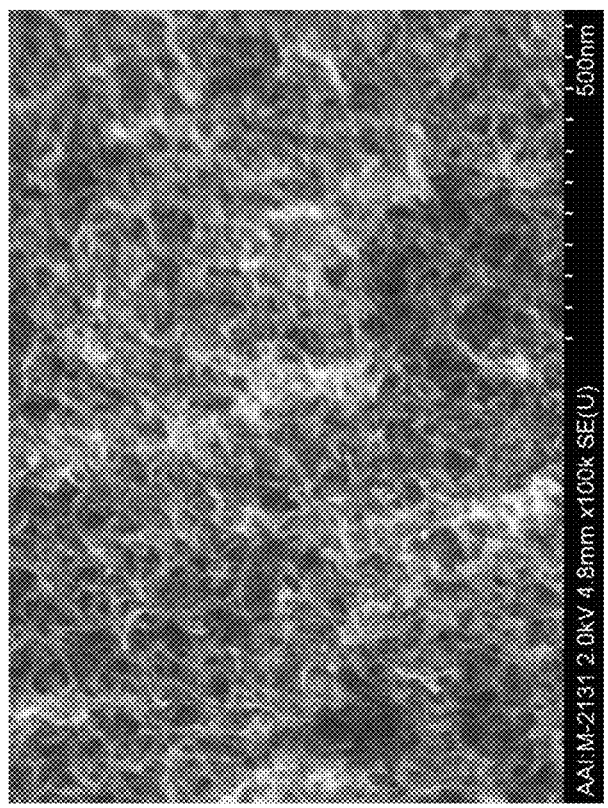
FIG. 8B is a scanning electron photomicrograph of a PY/PMDA=0.25, $H_2O$/PMDA=35, carbon aerogel sample.
Figure 8A:
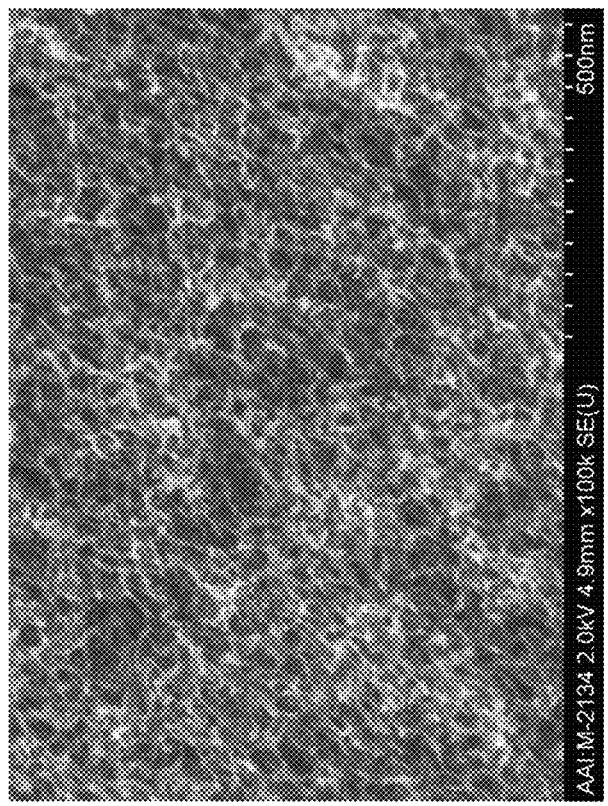
FIG. 8A is a scanning electron photomicrograph of a PY/PMDA=0.25, $H_2O$/PMDA=0, carbon aerogel sample.
Figure 9B:
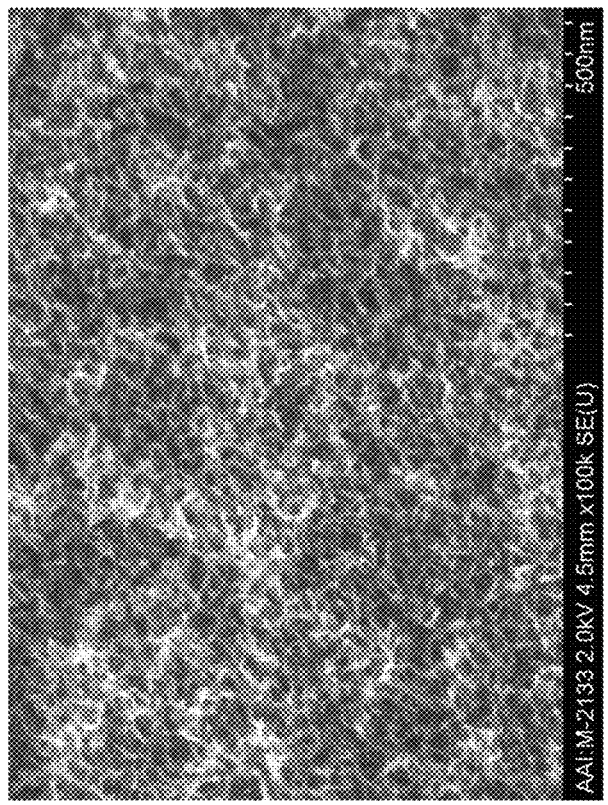
FIG. 9B is a scanning electron photomicrograph of a PY/PMDA=2.0, $H_2O$/PMDA=35, carbon aerogel sample.
Figure 9A:
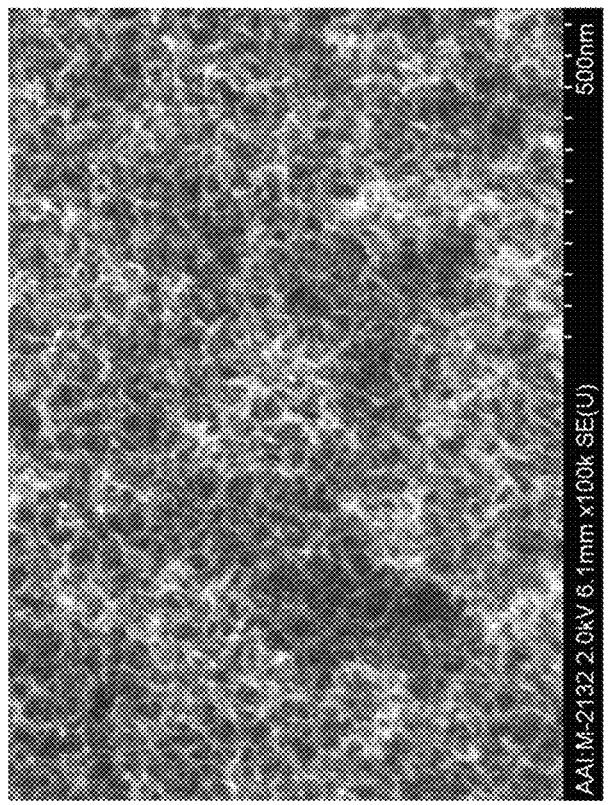
FIG. 9A is a scanning electron photomicrograph of a PY/PMDA=2.0, $H_2O$/PMDA=0, carbon aerogel sample.
Figure 10C:
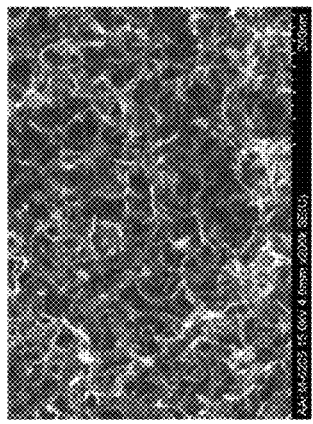
FIGS. 10A-10C are a series of scanning electron photomicrographs at 50,000, 100,000, and 200,000-fold magnification, respectively, of carbon aerogels from the carbonization of polyimide aerogels prepared with a Py/PMDA ratio of 0.45, and a $H_2O$/PMDA ratio of 0.
Figure 10F:
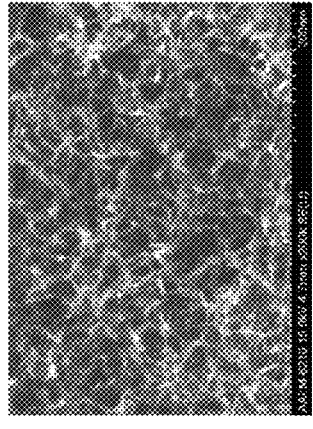
FIGS. 10D-10F are a series of scanning electron photomicrographs at 50,000, 100,000, and 200,000-fold magnification, respectively, of carbon aerogels from the carbonization of polyimide aerogels prepared with a Py/PMDA ratio of 0.45, and a $H_2O$/PMDA ratio of 10.
Figure 10B:
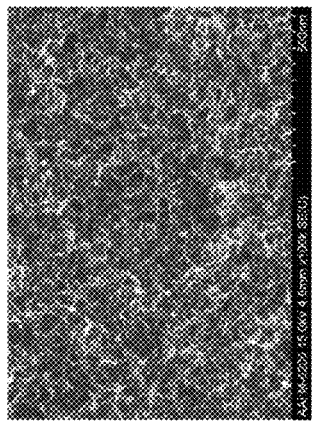
Figure 10E:
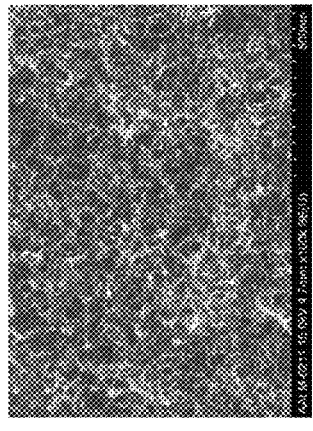
Figure 10A:
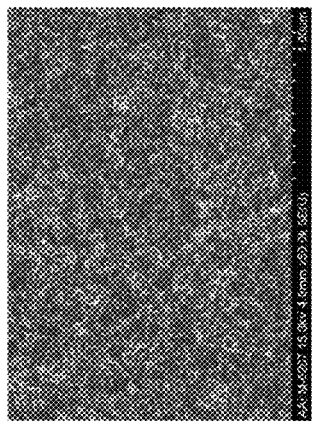
Figure 10D:
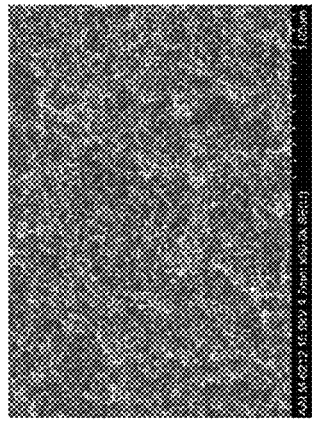
Figure 10I:
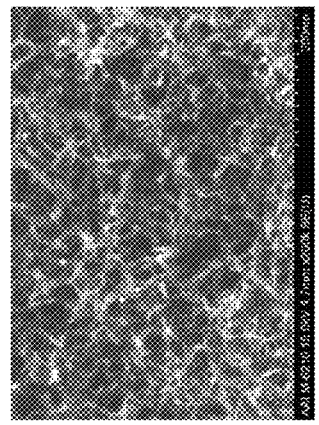
FIGS. 10G-10I are a series of scanning electron photomicrographs at 50,000, 100,000, and 200,000-fold magnification, respectively, of carbon aerogels from the carbonization of polyimide aerogels prepared with a Py/PMDA ratio of 0.45, and a $H_2O$/PMDA ratio of 35.
Figure 10H:
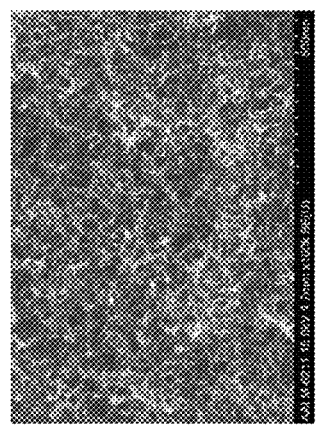
Figure 10G:
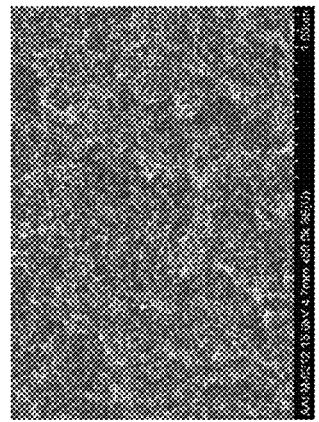

As illustrated in FIGS. 7A and 7B, a carbon aerogel prepared from carbonization of a polyimide aerogel from the disclosed method (Example 3) (FIG. 7B) had a fibrous structure comparable to that of a reference carbon aerogel from carbonization of a polyimide aerogel prepared by the reference method of Example 1 (FIG. 7A). Neither the concentration of pyridine (PY/PMDA), nor the amount of water added prior gelation seemed to have an impact on the structure of the carbon aerogel. FIGS. 8A and 8B illustrate SEM images of carbon aerogel samples made with PY/PMDA of 0.25 at $H_2O$/PMDA ratios of 0 and 35, respectively. FIGS. 9A and 9B illustrate SEM images of carbon aerogel samples made with PY/PMDA of 2.0 at $H_2O$/PMDA ratios of 0 and 35, respectively. SEM photomicrographs of carbon aerogel samples made at a PY/PMDA ratio of 0.45 at $H_2O$/PMDA ratios of 0, 10, and 35 are provided as FIGS. 10A-10C, FIGS. 10D-10F, and FIGS. 10G-10I, respectively. All samples exhibited fibrillar structure, regardless the concentration of water and pyridine.

Example 5. Preparation of PMDA-PDA Polyimide Gel with Varied Water and Pyridine Concentration, at Fixed Target Density (0.1 g/cc)

In another study, the effect of the $H_2O$/PMDA molar ratio at two different pyridine/PMDA molar ratios (0.25, and 0.45) on gelation time of PMDA-PDA polyimides at 0.1 g/cm$^3$ was evaluated. The $H_2O$/PMDA molar ratio was varied from 0 to 25 (0, 5, 10, 15, 20, 25; Table 3). Several representative procedures for the polyimide gel preparations are provided below as Examples 5.1 and 5.2.

TABLE 3

| Reagent molar ratios. | | |
|---|---|---|
| Factors | Molar ratios | Effects Evaluated |
| Py/PMDA (mol/mol) | 0.25, 0.45 | geltime ($T_g$), surface area |
| $H_2O$/PMDA (mol/mol) | 0, 5, 10, 15, 20, 25 | (BET), pore volume |

Example 5.1: Polyimide Gel Synthesis with Pyridine/PMDA=0.25 and $H_2O$/PMDA=10

Solid PMDA (6.76 g, 0.031 mol) was dissolved in 66 g of DMAc. After 30 min of stirring, PDA (3.35 g, 1:1 mol/mol ratio relative to PMDA) was added to the PMDA solution. The mixture was stirred for 4 h at room temperature. To the resulting polyamic acid solution, acetic anhydride (13.6 g, 4.3 mol/mol ratio relative to PMDA) was added, and the mixture was stirred for 20 minutes. At the end of the reaction period, pyridine (0.61 g, 0.25 mol/mol ratio relative to PMDA) was added to the solution. The resulting sol was stirred for 30 seconds, and 5.58 g of water (10 mol/mol ratio relative to PMDA) was added to the sol. Gelation took place at room temperature in about 3.15 min.

Example 5.2: Polyimide Gel Synthesis with Pyridine/PMDA=0.45 and $H_2O$/PMDA=5

Solid PMDA (6.76 g, 0.031 mol) was dissolved in 69 g of DMAc. After 30 min of stirring, PDA (3.35 g, 1:1 mol/mol ratio relative to PMDA) was added to the PMDA solution. The mixture was stirred for 4 h at room temperature. To the resulting polyamic acid solution, acetic anhydride (13.6 g, 4.3 mol/mol ratio relative to PMDA) was added, and the mixture was stirred for 20 minutes. At the end of the reaction period, pyridine (1.10 g, 0.45 mol/mol ratio relative to PMDA) was added to the solution. The resulting sol was stirred for 30 seconds, and 2.79 g of water (5 mol/mol ratio relative to PMDA) was added to the sol. Gelation took place at room temperature in about 5 min.

Results

Figure 11:
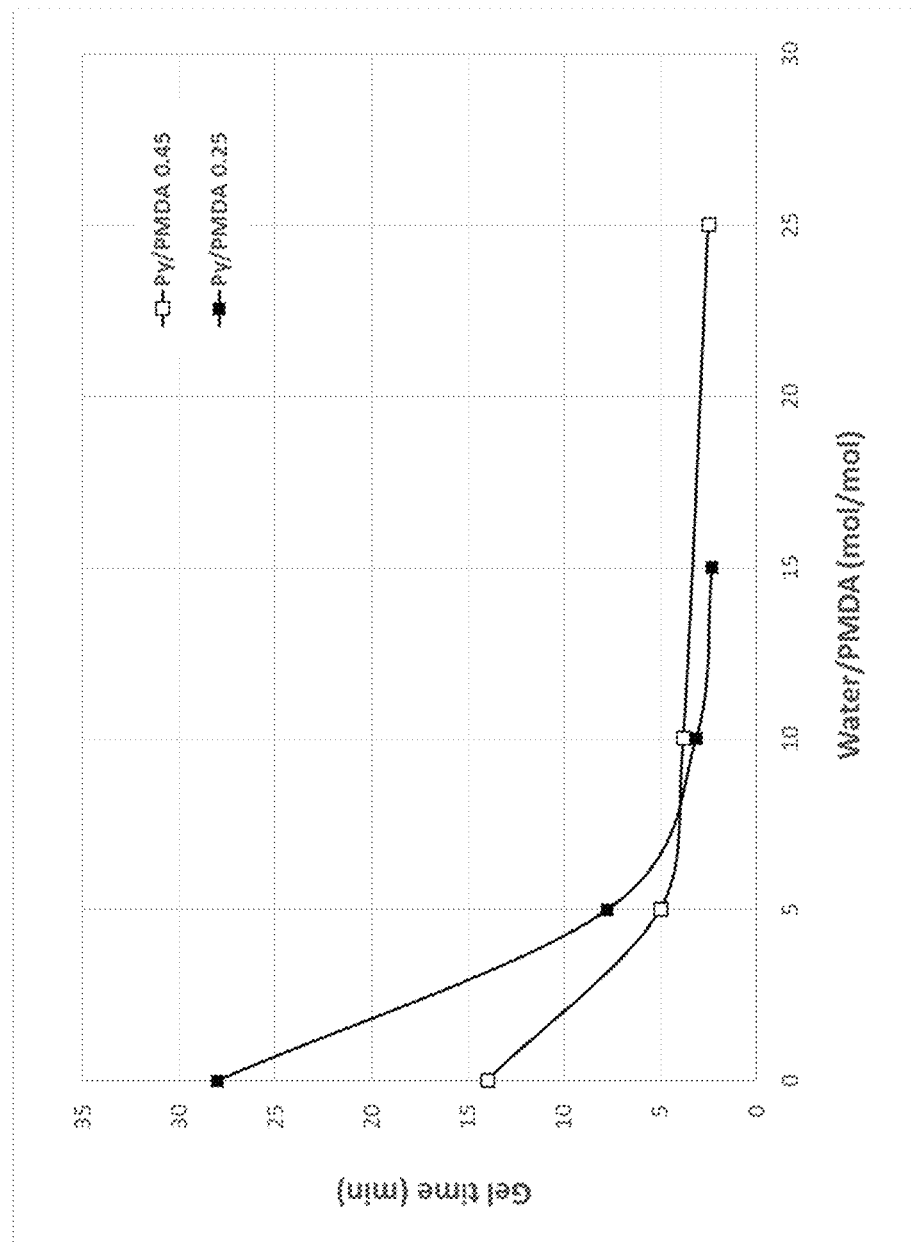
FIG. 11 is a plot of gel time versus the molar ratio of water to tetracarboxylic acid dianhydride for non-limiting embodiments of the disclosure.

The data for Examples 5.1 and 5.2 are provided in FIG. 11, which illustrates the rapid decrease of the gel time with increasing water concentration. At a $H_2O$/PMDA molar ratio of 15-25, the effect of the pyridine/PMDA molar ratio became practically insignificant, with gel time reaching a plateau of 2.5 min.

Example 6. Preparation of BTDA-PDA Polyimide Gel without Water Addition, Fixed Pyridine Concentration (Reference)

Polyimide gels were prepared at a target density of 0.14 g/cm$^3$. Solid 3,3',4,4'-benzophenone-tetracarboxylic dianhydride (BTDA, 10 g, 0.031 mol) was dissolved in 104 g of dimethylacetamide. After 30 min of stirring, 1,4-phenylenediamine (PDA; 3.8 g, 1:1 mol/mol ratio relative to BTDA) was added to the BTDA solution. The mixture was stirred for 2 h at room temperature. To the resulting solution of polyamic acid, acetic anhydride (14.9 g, 4.3 mol/mol ratio relative to BTDA) was added, and the mixture was stirred for 1 h. At the end of the reaction period, pyridine (1.28 g, 0.52 mol/mol ratio relative to BTDA) was added to the solution. After the addition of pyridine, the resulting sol was stirred for 2 min, and then poured into molds for gelation. Gelation took place at room temperature and was complete in about 68 min.

Example 7. Preparation of BTDA-PDA Polyimide Gel with Water Addition, at Two Different Pyridine Concentrations A study similar to that of Example 4 was performed with BTDA instead of PMDA. In order to evaluate the effect of the H$_2$O/BTDA molar ratio at two different pyridine/BTDA molar ratios (0.24, 0.52) on gelation time, BTDA-PDA polyimides were prepared at 0.14 g/cm$^3$ gel density in DMAc using acetic anhydride as the dehydrating agent. The H$_2$O/BTDA molar ratios were varied from 0 to 54 (0, 8, 18, 36, and 54). Several representative procedures for the polyimide gel preparations are provided below as Examples 7.1 and 7.2.

Example 7.1: Polyimide Gel Synthesis of Pyridine/BTDA=0.24 and H$_2$O/BTDA=36

Solid BTDA (10 g, 0.031 mol) was dissolved in 120 g of DMAc. After 30 min of stirring, PDA (3.8 g, 1:1 mol/mol ratio to BTDA) was added to the BTDA solution. The mixture was stirred for 2 h at room temperature. To the resulting solution of polyamic acid solution, acetic anhydride (14.9 g, 4.3 mol/mol ratio relative to BTDA) was added, and the mixture was stirred for 1 h. At the end of the reaction period, pyridine (0.59 g, 0.24 mol/mol ratio relative to BTDA) was added to the solution. The resulting sol was stirred for 2 min, and 40 g of water (36 mol/mol ratio relative to BTDA) was added to the sol. Gelation took place at room temperature in about 12 min.

Example 7.2: Polyimide Gel Synthesis of Pyridine/BTDA=0.52 and H$_2$O/BTDA=54

Solid BTDA (10 g, 0.031 mol) was dissolved in 120 g of dimethylacetamide. After 30 min of stirring, PDA (3.8 g, 1:1 mol/mol ratio to BTDA) was added to the BTDA solution. The mixture was stirred for 2 h at room temperature. To the resulting solution of polyamic acid solution, acetic anhydride (14.9 g, 4.3 mol/mol ratio relative to BTDA) was added, and the mixture was stirred for 1 h. At the end of the reaction period, pyridine (1.28 g, 0.52 mol/mol ratio relative to BTDA) was added to the solution. The resulting sol was stirred for 2 min, and 60 g of water (54 mol/mol ratio relative to BTDA) was added to the sol. Gelation took place at room temperature in about 3 min.

Results

Figure 12:
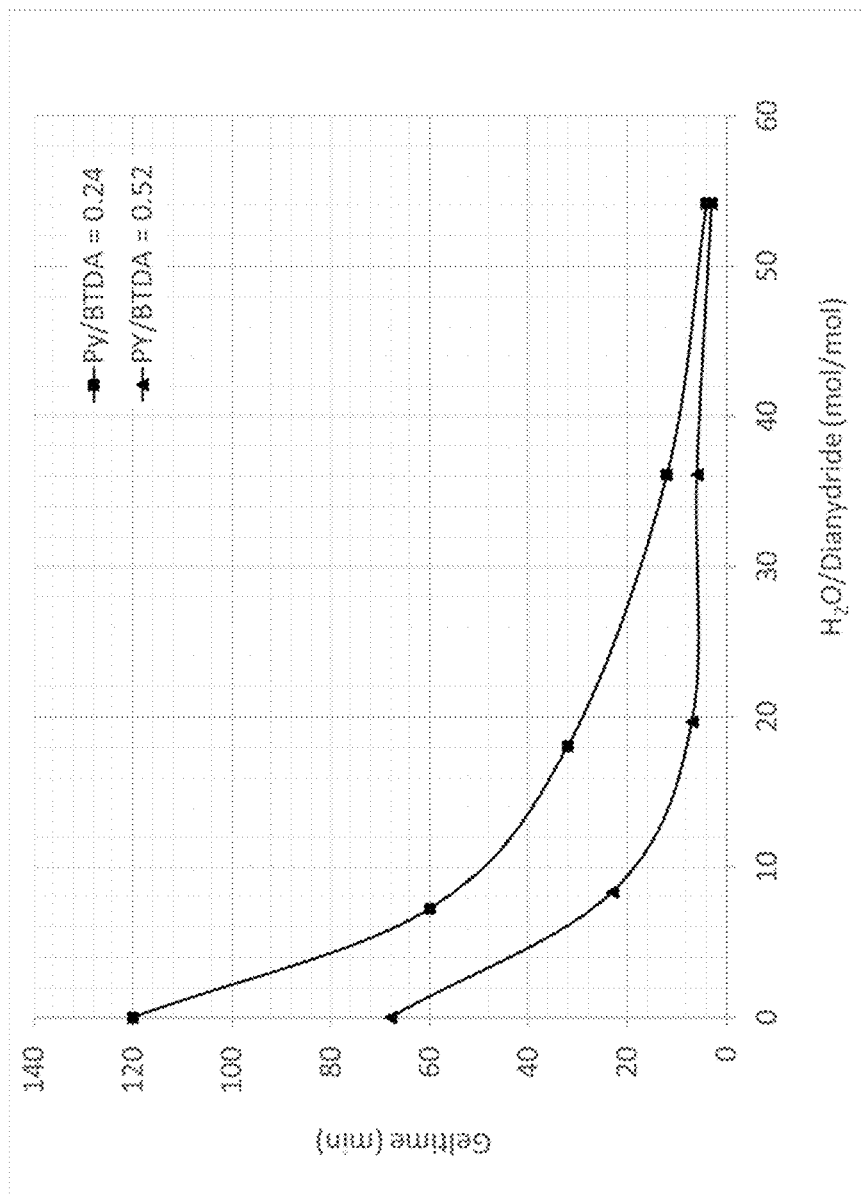
FIG. 12 is a plot of gel time versus the molar ratio of water to tetracarboxylic acid dianhydride for non-limiting embodiments of the disclosure.
Figure 13:
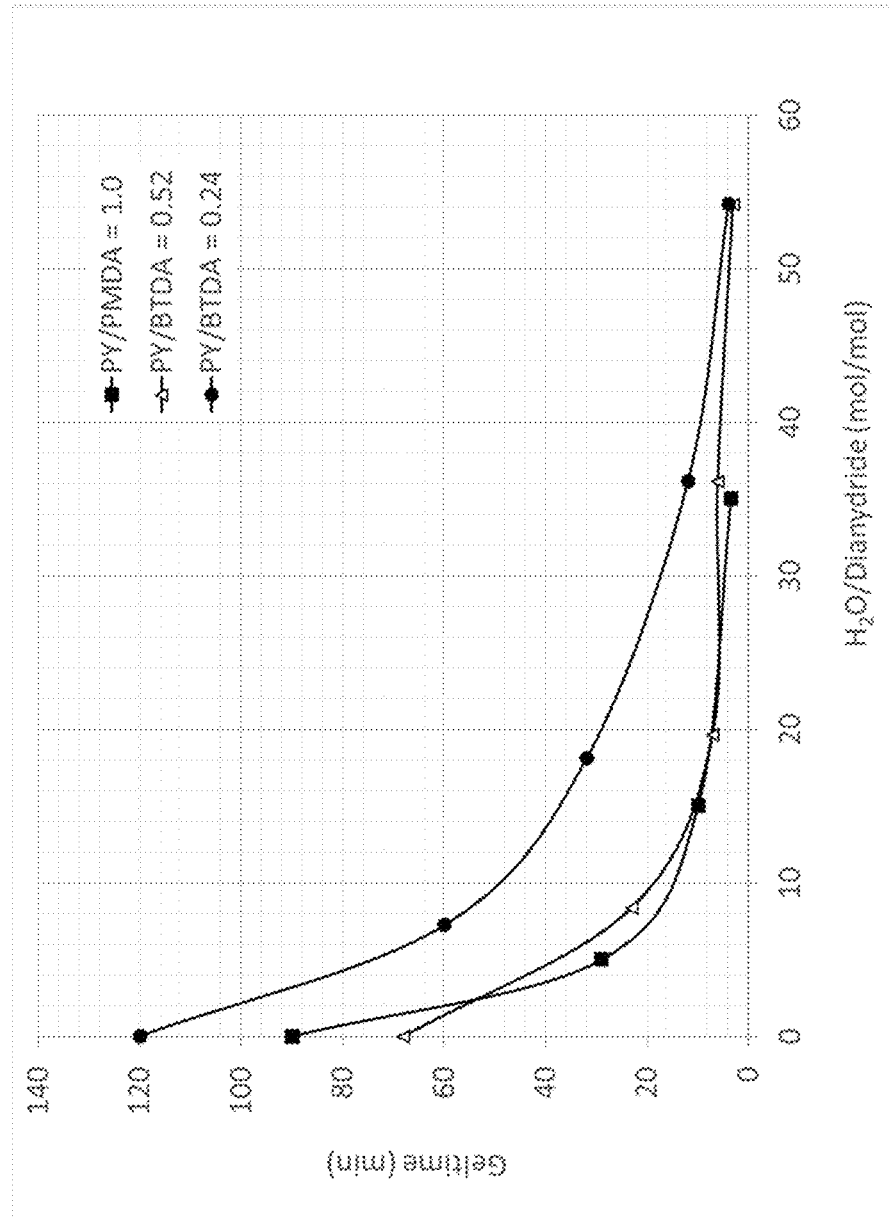
FIG. 13 is a plot of gel time versus the molar ratio of water to tetracarboxylic acid dianhydride for non-limiting embodiments of the disclosure.

The effect of the H$_2$O/BTDA ratio on gel time at the two different pyridine/BTDA molar ratios for Example 6 is provided in FIGS. 12 and 13. With reference to FIG. 13, the data demonstrated that the gel time behaved similarly with different dianhydrides and water as co-catalytst. Specifically, gel time decreased with increasing water molar ratio. Notably, the gelation of BTDA-PDA polyimide is similar to that of the PMDA-PDA polyimide (0.05 g/cc target density) over the whole range of water, despite the lower concentration of pyridine (0.52 vs 1.0).

Example 8. Preparation of BPDA-PDA Polyimide Gel with Varied Water and Fixed Pyridine Concentration A study was performed to evaluate the effect of different molar ratios of water on gelation of a polyamic acid prepared with a different dianhydride (biphthalic dianhydride; BPDA). The study was performed using the procedure of Example 4, but using BPDA in place of PMDA, and using the molar ratios provided in Table 4. A representative procedure for the polyimide gel preparations are provided below as Example 8.1.

TABLE 4

| Reagent molar ratios. | |
| --- | --- |
| Factors | Molar ratios |
| Py/BPDA (mol/mol) | 0.93 |
| H$_2$O/BPDA (mol/mol) | 0, 8, 35, 42, and 70 |

Example 8.1. Preparation of BPDA-PDA Polyimide Gel with Pyridine/BPDA=0.93, and H$_2$O/BPDA=35

Solid BPDA (10 g, 0.034 mol) was dissolved in 187 g of dimethylacetamide. The dissolution of BPDA is completed, only after addition of the diamine. After 15 min of stirring, PDA (3.66 g, 1:1 mol/mol ratio to BPDA) was added to the BPDA solution. The mixture was stirred for 2 h at room temperature. To the resulting solution of polyamic acid solution, acetic anhydride (14.5 g, 4.3 mol/mol ratio relative to BPDA) was added, and the mixture was stirred for 1 h. At the end of the reaction period, pyridine (2.51 g, 0.93 mol/mol ratio relative to BPDA) was added to the solution. The resulting sol was stirred for 2 min, and 21.5 g of water (35 mol/mol ratio relative to BPDA) was added to the sol. Gelation took place at room temperature in about 12 min.

Figure 14:
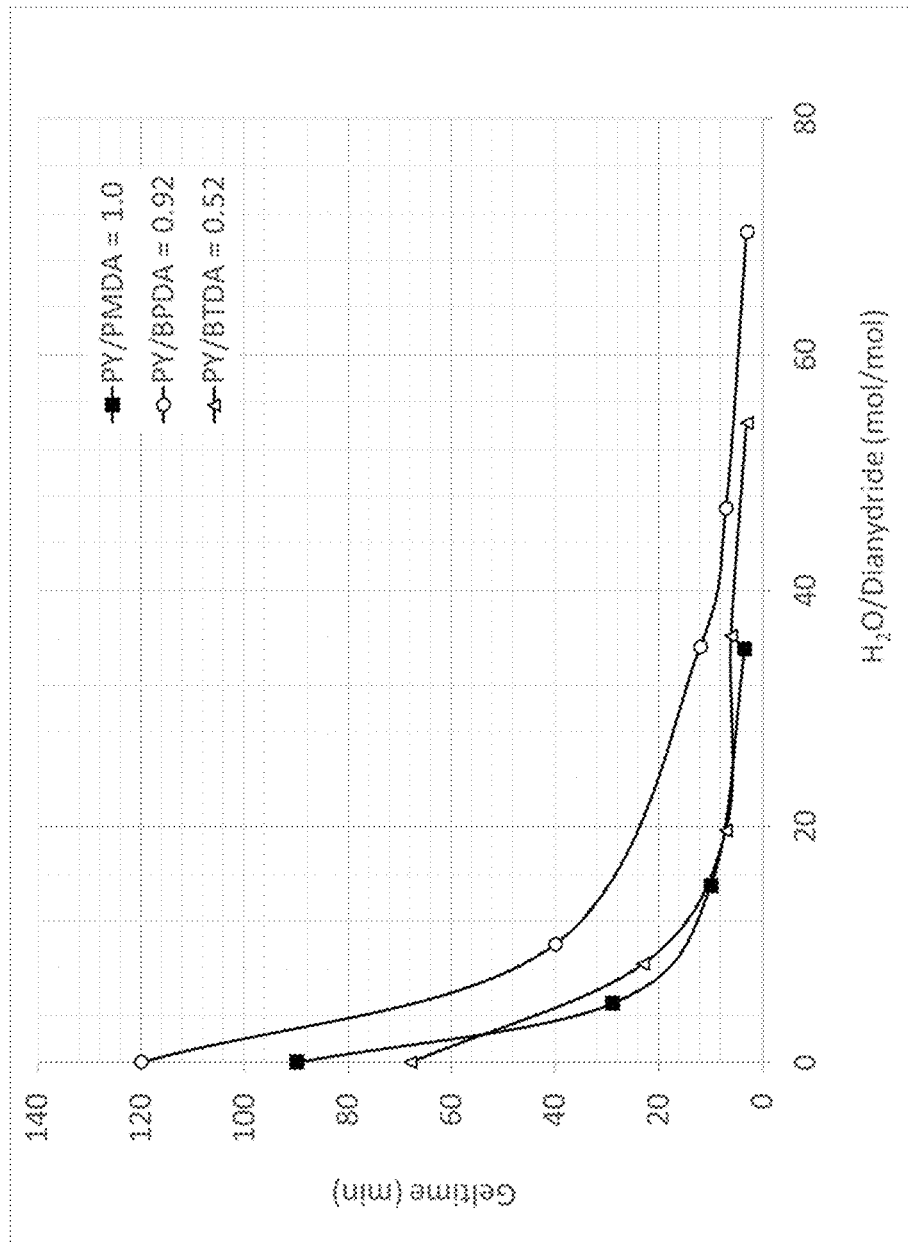
FIG. 14 is a plot of gel time versus the molar ratio of water to tetracarboxylic acid dianhydride for non-limiting embodiments of the disclosure.

The results (FIG. 14) demonstrate the longer gelation time of the polyamic acid sol made from BPDA, despite the higher pyridine concentration relative to the ones used with BTDA, requiring higher water concentrations to achieve rapid gelation.

Example 9. Summary Data

The sol-gel compositions for each of the gels synthesized in Examples 1-8 are provided in FIG. 15. Density, linear shrinkage, and carbon yield of the polyimide aerogels described in Examples 1-7, before and after carbonization (1050° C. under nitrogen for 2 hrs), are provided as FIG. 16.

The invention claimed is:

1. A method of forming a polyimide gel, the method comprising:
   a) providing a tetracarboxylic acid dianhydride and a multifunctional amine;
   b) adding the tetracarboxylic acid dianhydride and the multifunctional amine to an organic solvent to form a solution;
   c) allowing the tetracarboxylic acid dianhydride and the multifunctional amine to react in solution, forming a solution of a polyamic acid sol;
   d) adding a dehydrating agent, a monoamine, and water to the solution of the polyamic acid sol, forming a gelation mixture and allowing the gelation mixture to gel to form the polyimide gel, wherein the water is added at a molar ratio of water to the tetracarboxylic acid dianhydride from about 5 to about 500.

2. The method of claim 1, wherein the tetracarboxylic acid dianhydride is selected from the group consisting of pyromellitic anhydride (PMDA), biphthalic dianhydride (BPDA), oxydiphthalic dianhydride (ODPA), benzophenone tetracarboxylic dianhydride (BTDA), ethylenediaminetetraacetic dianhydride (EDDA), 1,4,5,8-naphthalenetetracarboxylic dianhydride, and combinations thereof.

3. The method of claim 1, wherein the multifunctional amine is 1,3,5-tris(4-aminophenoxy)benzene (TAPOB), tris (4-aminophenyl)methane, melamine, or a combination thereof.

4. The method of claim 1, wherein the multifunctional amine is an alkane diamine or an aryl diamine.

5. The method of claim 4, wherein the alkane diamine is ethylenediamine, 1,3-diaminopropane, 1,4-diaminobutane, 1,5-diaminopentane, 1,6-diaminohexane, or a combination thereof.

6. The method of claim 4, wherein the aryl diamine is 1,4-phenylenediamine, 4,4'-diaminodiphenyl ether, 4,4'-methylenedianiline, or a combination thereof.

7. The method of claim 1, wherein a molar ratio of the tetracarboxylic acid dianhydride to the multifunctional amine is from about 0.9 to about 3, or from about 0.9 to about 1.1.

8. The method of claim 1, wherein a molar ratio of the monoamine to the polyamic acid sol is from about 0.1 to about 8.

9. The method of claim 1, wherein a quantity of the monoamine required to be added to achieve formation of the polyimide gel with a gelation time under about 15 minutes is reduced by up to about 50-fold relative to a method of forming a polyimide gel in the absence of water.

10. The method of claim 1, wherein the monoamine is a tertiary alkyl amine, a tertiary cycloalkyl amine, a heteroaromatic amine, a guanidine, or a quaternary ammonium hydroxide.

11. The method of claim 1, wherein the monoamine is selected from the group consisting of trimethylamine, triethylamine, tri-n-propylamine, tri-n-butylamine, N-methylpyrrolidine, N-methylpiperidine, diisopropylethylamine, pyridine, quinoline, guanidine, and a tetraalkylammonium hydroxide.

12. The method of claim 1, wherein the monoamine is pyridine.

13. The method of claim 1, wherein a molar ratio of the dehydrating agent to the tetracarboxylic acid dianhydride is from about 2 to about 10, from about 3 to about 6, or from about 4 to about 5.

14. The method of claim 1, wherein the dehydrating agent is a carboxylic acid anhydride.

15. The method of claim 14, wherein the carboxylic acid anhydride is acetic anhydride.

16. The method of claim 1, wherein the organic solvent is N,N-dimethylacetamide, N,N-dimethylformamide, N-methylpyrrolidone, tetrahydrofuran, ethyl acetate, or a combination thereof.

17. The method of claim 1, wherein a range of concentration of the polyamic acid sol in the solution is from about 0.01 to about 0.3 g/cm$^3$.

18. The method of claim 1, wherein the multifunctional amine and the tetracarboxylic acid dianhydride are allowed to react for a period of time from about 0.5 hour to about 17 hours.

19. The method of claim 1, wherein the multifunctional amine and the tetracarboxylic acid dianhydride are allowed to react at a temperature from about 10 to about 100° C., from about 15 to about 60° C., from about 15 to about 50° C., or from about 15 to about 25° C.

20. The method of claim 1, wherein a length of time from addition of the monoamine and water until gelation of the polyimide is less than about 1 minute, or less than about 30 seconds, or less than about 15 seconds.

21. The method of claim 1, further comprising:
   prior to complete gelation of the gelation mixture, casting the gelation mixture in a mold to form a polyimide wet-gel monolith;
   demolding the polyimide wet-gel monolith;
   washing or solvent exchanging the polyimide wet-gel monolith; and
   drying the polyimide wet-gel monolith to form a monolithic polyimide aerogel or xerogel.

22. The method of claim 21, wherein the monolith has a thickness from about 5 to about 25 mm.

23. The method of claim 21, wherein the monolith is a film having a thickness from about 50 microns to about 1 mm.

24. The method of claim 21, wherein the washing or solvent exchanging is performed with water, a C1 to C3 alcohol, acetone, acetonitrile, ether, tetrahydrofuran, toluene, liquid carbon dioxide, or a combination thereof.

25. The method of claim 21, wherein drying comprises lyophilizing the polyimide wet-gel, or contacting the polyimide wet-gel with supercritical fluid $CO_2$.

26. The method of claim 21, further comprising carbonizing the monolithic polyimide aerogel or xerogel to form a carbon aerogel or xerogel.

27. The method of claim 26, wherein the carbon aerogel has substantially the same properties as a carbon aerogel prepared by carbonizing a corresponding polyimide wet-gel that has been prepared by an imidization method which does not include water.

28. The method of claim 1, wherein the polyimide gel is in the form of beads, the method further comprising:
   e) prior to complete gelation of the gelation mixture, adding the gelation mixture to mineral oil, silicone oil, a C5-C12 hydrocarbon, or mineral spirits to form an emulsion; and
   f) stirring the emulsion under high-shear conditions to form polyimide beads having a diameter from about 5 microns to about 200 microns.

29. The method of claim 28, further comprising adding one or more surfactants to the gelation mixture or the emulsion.

30. The method of claim 28, further comprising drying the polyimide beads under elevated temperature conditions or with supercritical fluid $CO_2$.

31. The method of claim 1, wherein the polyimide gel is in the form of beads, the method further comprising:
  e) prior to complete gelation, spraying the gelation mixture into air or into mineral oil, silicone oil, a C5-C12 hydrocarbon, or mineral spirits, to form polyimide beads having a diameter from about 5 microns to about 250 microns.

32. The method of claim 31, wherein the method is carried out as a continuous process, the continuous process further comprising conveying the polyimide beads through one or more of:
  filtering;
  aging;
  solvent exchanging;
  drying;
  carbonizing.

33. The method of claim 1, further comprising adding silicon to the polyamic acid prior to dehydration or prior to gelation.

34. A method of forming a polyimide gel, the method comprising:
  a) providing a tetracarboxylic acid dianhydride and a multifunctional amine;
  b) adding the tetracarboxylic acid dianhydride and the multifunctional amine to an organic solvent to form a solution;
  c) allowing the tetracarboxylic acid dianhydride and the multifunctional amine to react in solution, forming a solution of a polyamic acid sol;
  d) adding a dehydrating agent, a monoamine, and water to the solution of the polyamic acid sol, forming a gelation mixture and allowing the gelation mixture to gel to form the polyimide gel, wherein the water is added at a molar ratio of water to the tetracarboxylic acid dianhydride greater than about 5.

* * * * *